(12) United States Patent
Uchida et al.

(10) Patent No.: US 6,728,248 B1
(45) Date of Patent: Apr. 27, 2004

(54) OPTICAL LINE TERMINAL

(75) Inventors: Kazuhiro Uchida, Fukuoka (JP); Kazuya Ryu, Fukuoka (JP); Kanna Okamura, Fukuoka (JP); Masashi Shibata, Fukuoka (JP); Shinichi Fujiyoshi, Fukuoka (JP); Katsuhiko Hirashima, Fukuoka (JP); Toshinori Koyanagi, Kawasaki (JP); Toshiyuki Sakai, Kawasaki (JP); Setsuo Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/515,991

(22) Filed: Feb. 29, 2000

(30) Foreign Application Priority Data

Apr. 16, 1999 (JP) .......................... 11-110039

(51) Int. Cl.⁷ .............................. H04L 12/28
(52) U.S. Cl. ................... 370/395.1; 370/420; 398/45
(58) Field of Search .................. 370/230, 468, 370/236.2, 412, 464, 471, 449, 392, 503, 509, 517, 420, 359, 401, 395.6, 395.1; 725/119; 398/45; 359/154, 157, 158, 159

(56) References Cited

U.S. PATENT DOCUMENTS

| | | | |
|---|---|---|---|
| 4,593,350 A | | 6/1986 | Mitchell et al. |
| 5,166,675 A | * | 11/1992 | Amemiya et al. ..... 340/825.08 |
| 5,539,743 A | | 7/1996 | Amemiya et al. |
| 5,598,419 A | | 1/1997 | Weigand et al. |
| 5,790,293 A | * | 8/1998 | Frigo .......................... 359/173 |
| 6,011,637 A | * | 1/2000 | Pfeiffer ........................ 359/120 |
| 6,023,467 A | * | 2/2000 | Abdelhamid et al. ........ 370/395 |
| 6,463,075 B1 | * | 10/2002 | Hoebeke ...................... 370/458 |
| 6,519,255 B1 | * | 2/2003 | Graves ........................ 370/392 |

FOREIGN PATENT DOCUMENTS

| | | |
|---|---|---|
| EP | 0107026 A1 | 5/1984 |
| EP | 0123507 A1 | 10/1984 |
| EP | 0385431 A2 | 9/1990 |
| EP | 0 702 470 A1 | 3/1996 |
| GB | 2285726 A | 7/1995 |
| GB | 0 294 849 A | 5/1996 |
| GB | 2310119 A | 8/1997 |
| GB | 2394053 A | 10/2000 |
| JP | 07-177170 | 7/1995 |
| JP | 11-88348 | 3/1999 |
| WO | WO 83/03910 | 11/1983 |

* cited by examiner

*Primary Examiner*—Duc Ho
(74) *Attorney, Agent, or Firm*—Katten Muchin Zavis Rosenman

(57) ABSTRACT

An optical line terminal which sends and receives messages or data to/from optical network units (ONUs) connected thereto. A cyclic message monitor produces a trigger signal, for use in a PLOAM grant generator, at certain intervals in harmonization with upstream messages that a specific optical network unit regularly transmits. A downstream message monitor watches outgoing downstream messages to detect a certain message requesting an ONU to return a response, and it triggers the PLOAM grant generator if such a message is detected. An upstream message monitor detects an upstream message whose identification code indicates that the sending ONU has no information to return. If such an upstream message is found, it limits the issuance of PLOAM grants to that optical network unit. The PLOAM grant generator produces PLOAM grants which permit ONUs to transmit their messages, and sends them out through a PLOAM cell transmitter.

13 Claims, 24 Drawing Sheets

OPTICAL LINE TERMINAL

BACKGROUND OF THE INVENTION

1. Field of the Invention

The present invention relates to an optical line terminal, and more particularly, to an optical line terminal which controls one or more optical network units connected thereto.

2. Description of the Related Art

Today's telecommunications market needs call for rapid deployment of optical access networks, notably the "Fiber to the Home" (FTTH) systems, to provide more sophisticated data communications services. In particular, ATM-based passive optical networks (ATM-PON) are of great interest as an enabling technology for high-bandwidth low-cost data network systems.

FIG. 23 illustrates a typical ATM-PON system, in which an optical line terminal (OLT) 5 is linked with a plurality of optical network units 1-1 to 1-3 via fiber optic cables 2-1, 2-2, 2-3, and 4 being joined together with a passive optical star coupler 3. ITU-T Recommendation G.983.1 describes how to control such a plurality of ONUs from a single termination circuit of the OLT. This ITU-T recommendation defines dedicated Physical Layer Operation and Management (PLOAM) cells to allow the OLT to monitor and control its subordinate ONUs. Using PLOAM cells, the OLT supplies the ONUs with control parameters for them, and the ONUs send their information back to the OLT. There are a plurality of predefined messages encoded to represent various kinds of information to be sent by the OLT and ONUs.

Each ONU needs permission from the OLT when it transmits PLOAM cells to the OLT. This permission is known as the "PLOAM grants," which are mapped in a PLOAM cell sent from OLT to ONUs (this direction is referred to hereafter as "downstream"). Each single PLOAM grant permits one specific ONU to send a single PLOAM cell to the OLT (this direction is referred to hereafter as "upstream"). The PLOAM grants have unique pre-assigned values, which vary from ONU to ONU. This nature allows the OLT to control the traffic of upstream PLOAM cells sent from ONUs on the same ATM-PON network, on an individual basis by manipulating PLOAM grant values appropriately.

FIG. 24 shows, in a simplified way, how OLT and ONUS transmit PLOAM cells. It is assumed that there are a plurality (n) of ONUs (ONU #1 to ONU #n) being linked to their local OLT. Small boxes PG1 to PGn represent PLOAM grants corresponding to ONU #1 to ONU #n, respectively. As seen from FIG. 24, the OLT sends downstream PLOAM cells to issue a sequence of PLOAM grants PG1 to PGn. After a predetermined period, the ONUs respond to them by sending upstream messages in the order of ONU #1, ONU #2, . . . ONU #n. When the responding ONU has no information to return, it replies so by sending a PLOAM cell with a what is known as "no message" code. In this way, the ONUs return a PLOAM cell of some kind in response to each PLOAM grant even if they have no substantial information to send.

Downstream messages from the OLT may be divided into the following three categories in terms of how frequently they are sent: (1) messages to be sent regularly (hereafter "cyclic messages"), (2) messages that should be delivered within a predetermined time limit (hereafter "time-critical message"), and (3) messages to be sent on demand (hereafter "non-critical message"). Similarly, upstream messages from ONUs can be categorized into the following three groups: (1) messages to be sent regularly, (2) messages that have to be returned to the OLT in response to some particular messages sent therefrom, and (3) messages to be sent at the discretion of ONUs. While the OLT can send those messages at any time as required, ONUs need to obtain a PLOAM grant in advance of transmission of each message.

In addition to the messages described above, the ATM-PON system transport ATM cells containing user data, which are referred to hereafter as "data cells." As with the above-noted message cells (i.e., PLOAM cells), ONUs need permission from their local OLT before sending those data cells. This permission is known as "data grants." Similarly to PLOAM grants, data grants are mapped on a certain field of a PLOAM cell for delivery to ONUs at the beginning of each frame, where different codes of data grants are assigned to individual ONUs. The OLT communicates with ONUs by sending and receiving message cells and data cells, while issuing such PLOAM grants and data grants as required.

In the meantime, the upstream signals from ONUs in an ATM-PON system are transported over separate optical transmission lines initially and combined by an optical star coupler before reaching the OLT. Since the OLT-ONU distances may vary from ONU to ONU, the upstream transmission signals reach the OLT after different delay times. Therefore, without appropriate delay compensation mechanisms, upstream cells sent by the ONUs in response to PLOAM grants or data grants could collide with each other at the point where the signals are combined (i.e., optical star coupler), thus disrupting the data to be received by the OLT.

To work around the problem of uneven signal delays, each ONU employs an equalization mechanism which intentionally adds an appropriate time delay to its outgoing cells. More specifically, this additional delay equals the difference between each ONU's specific delay time and the maximum delay time observed in the ATM-PON system, so that all ONUs' round trip delays will be totally equalized. Such ONU-specific delay times are measured when each ONU is activated as a node in the ATM-PON system. When a new ONU is connected, the OLT stops issuing any grants to temporarily clear out the upstream traffic, and instead issues unassigned grants to indicate that a delay measurement process is under way. This time period established for delay measurement is referred to as the "ranging window," or simply "window" in the G.983.1 terminology. When such a window is open, the OLT causes the target ONU, which is now in the process of activation, to return a certain message for delay measurement. Observing a subsequent response from the target ONU, the OLT measures the cell delay time specific to that ONU. The delay time measured in this way will be used to avoid a upstream cell collisions during normal communication operations.

While the specifications of such ATM-PON systems are provided in the ITU-T recommendations G.983.1, the lack of some detailed definitions actually causes several problems in the following areas.

(1) Discarding of Upstream Messages in ONUs

As previously noted, each ONU needs to get permission, or PLOAM grants, from its local OLT, when it transmits a PLOAM cell to the OLT. Upstream messages from ONUs, on the other hand, are not uniform, but include (a) messages to be sent regularly, (b) messages to be sent in response to the OLT's requests, and (c) messages to be sent at each ONU's discretion. This means that the OLT has to send PLOAM grants in a timely manner, taking into consideration the frequencies of those upstream messages. If it is unable to do so, the OLT is likely to miss some messages from the ONUs.

One possible method to satisfy the above requirement is the use of buffer storage in an ONU to temporarily hold a certain amount of messages, so that the ONU will transmit all its pending messages without discarding them as long as the OLT's PLOAM grant delays are within a tolerable range. However, this requires the OLT to issue PLOAM grants that outpaces the production of messages in the ONUs. Otherwise, the buffer in an ONU would be gradually filled with the pending messages, some of which should be discarded in the end. Although some predictable messages such as those of types (a) and (b) might not be discarded as long as the OLT can send PLOAM grants constantly for them, this method cannot work well for unpredictable messages of type (c).

(2) Discarding of Upstream Messages in OLT

In general, OLT has buffer storage for temporarily storing messages (PLOAM cells) received from ONUs for later parsing and processing. Some messages require a long processing time more than one cell interval. Also, other higher-priority tasks may interrupt the message handling process, keeping it in a suspended state for a while. If such conditions continue, the OLT would be forced to discard some pending messages due to the message buffer overflow.

(3) Timing Contentions Among Downstream Messages

Downstream messages can be classified into the following groups: (a) cyclic messages, (b) time-critical messages, and (c) spontaneous, non-critical messages. The OLT must send those messages in a timely manner to satisfy their temporal requirements. Suppose here that there is a spontaneous message of type (c) conflicting with a temporally restricted message of type (a) or (b). If the OLT serves the former message first, for instance, the temporal requirement of the latter messages may not always be ensured.

(4) Allocation of Upstream Bandwidth

The OLT is responsible for allocating necessary upstream bandwidths to ONUs on the network by issuing data grants in an appropriate manner. However, no practical methods have been proposed in this technical area.

(5) Pending Grants When Ranging Window is Open

The OLT opens a ranging window by issuing unassigned grants only when measuring the cell delay time (or distances) of an ONU. This window period occupies time slots for data cells and PLOAM cells, meaning that some data grants and PLOAM grants ONUs should be queued while the window is open. On the other hand, the service provider must guarantee a specific user bandwidth for conformance to the service contract with their customers. In other words, the OLT is obliged to continuously output a prescribed number of data grants per unit time, and for this reason, it is necessary to ensure the issuance of data grants when it is interrupted. To date, however, no practical methods have been proposed to satisfy this requirement. Another related problem is that the issuance of data grants may be postponed until PLOAM grants are processed.

(6) Handling of Queued Message During Window Period

The OLT has a first-in first-out (FIFO) buffer to store incoming messages from ONUs before parsing and processing them. Delay measurement messages received from ONUs during a window period are also entered to the FIFO buffer. The OLT has to test whether those delay measurement messages have been returned properly within the predetermined window period, as well as filtering out other kinds of messages received during that period.

On the other hand, the message handler in the OLT processes incoming messages in the order of reception, reading out each from the FIFO buffer. That is, the processing of upstream messages is performed without reference to the reception time of each upstream cell. This leads to a lack of synchronization between the incoming messages and window period indicator, thus making it difficult for the OLT to test whether each delay measurement message has been returned properly within the window period.

(7) Validity Checking for Delay Measurement Messages

In a ranging process, the OLT measures upstream cell delay times by analyzing the phase of each received delay measurement message. In parallel with the measurement, the OLT has to check whether the received delay measurement message is correct or not. Conventional OLTs, however, are unable to make this test correctly, since they perform the delay measurement and message handling processes asynchronously with each other for the same reason as described in the preceding item (6).

SUMMARY OF THE INVENTION

Taking the above into consideration, an object of the present invention is to provide an optical line terminal which can send and receive messages more reliably.

To accomplish the above object, according to the present invention, there is provided a an optical line terminal which controls one or more optical network units connected thereto. This optical line terminal comprises the following elements: a cyclic trigger signal generator which generates a trigger signal at predetermined intervals; a PLOAM grant generator which produces a message transmission permission (or PLOAM grant) which permits one of the optical network units to transmit a message, in synchronization with the trigger signal generated by the cyclic trigger signal generator; and a PLOAM cell transmitter which transmits to the optical network units the message transmission permission produced by the PLOAM grant generator.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
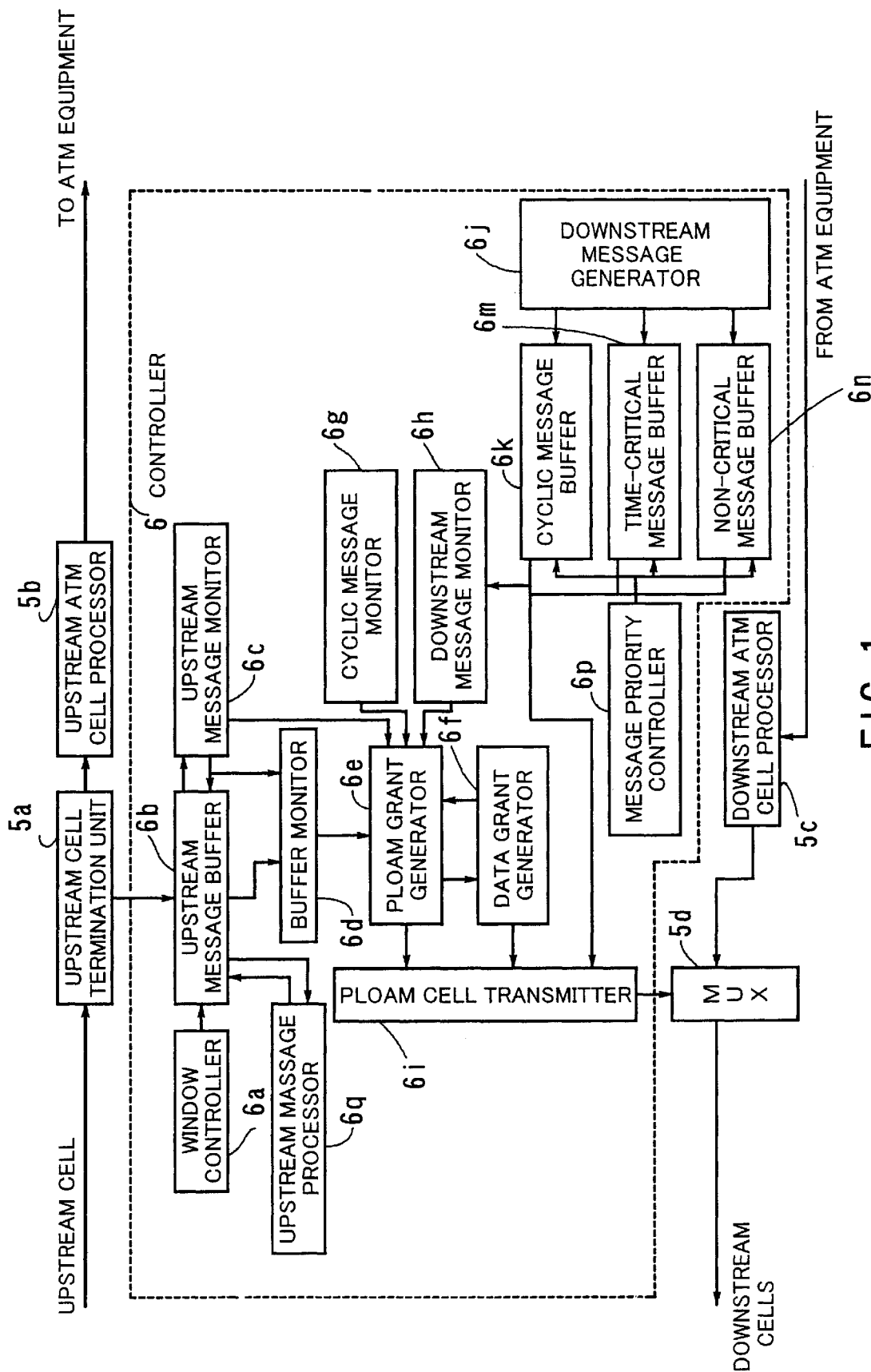
FIG. 1 is a block diagram which shows an embodiment of the present invention.

FIG. 1 is a block diagram of an optical line terminal (OLT) where the present invention is embodied. In this preferred embodiment of FIG. 1, upstream cells sent from ONUs (not shown) are received by an upstream cell termination unit 5a. It separates PLOAM cells from others and supplies them to an upstream message buffer 6b in a controller 6, while providing the other cells to an upstream ATM cell processor 5b. The upstream ATM cell processor 5b passes upstream ATM cells (upstream user cells) to ATM equipment (not shown) after applying a predetermined process to them.

The controller 6 extracts messages out of the received upstream cells and applies relevant processes to them. It also handles downstream traffic including insertion of PLOAM cells, etc. The ATM equipment provides downstream ATM cells (downstream user cells) to a downstream ATM cell processor 5c. The downstream ATM cell processor 5c then passes them to a multiplexer (MUX) 5d after applying a predetermined process to them. The MUX 5d multiplexes downstream ATM cells and PLOAM cells into a single stream in the time domain so as to transmit them to ONUs in a prescribed sequence.

The controller 6 comprises the following functional units: a window controller 6a, an upstream message buffer 6b, an upstream message monitor 6c, a buffer monitor 6d, a PLOAM grant generator 6e, a data grant generator 6f, a cyclic message monitor 6g, a downstream message monitor 6h, a PLOAM cell transmitter 6i, a downstream message generator 6j, a cyclic message buffer 6k, a time-critical message buffer 6m, a non-critical message buffer 6n, a message priority controller 6p, and an upstream message processor 6q. The functions of these units will be briefly described as follows.

The window controller 6a executes processes related to the ranging window to be opened when activating an ONU. The upstream message buffer 6b temporarily stores upstream cells supplied from the upstream cell termination unit 5a. The upstream message monitor 6c detects a message identification code of "no message" contained in a received upstream message, and if "no message" is found, it extracts its PON ID to identify which ONU is sourcing the message. The upstream message monitor 6c also triggers generation of PLOAM grants directed to such ONUs that have sent upstream messages other than "no message."

The buffer monitor 6d commands the PLOAM grant generator 6e to temporarily stop sending PLOAM grants, if the number of pending messages accumulated in the upstream message buffer 6b exceeds a predetermined threshold. The upstream message monitor 6c also monitors the messages accumulated in the upstream message buffer 6b, and if a "no message" message received from any particular ONU is found, it then directs the PLOAM grant generator 6e to temporarily stop sending PLOAM grants to that ONU.

The PLOAM grant generator 6e produces PLOAM grant signals indicating permission of PLOAM cell transmission granted to specific ONUs. The PLOAM grant generator 6e supplies these signals to the PLOAM cell transmitter 6i. The data grant generator 6f, on the other hand, produces data grants indicating permission for the transmission of ATM cell that is granted to specific ONUs. It supplies such data grants to the PLOAM cell transmitter 6i. Here, the data grant generator 6f controls the frequency of data grants for each ONU in such a way that the resulting usage of upstream cell slots will yield a desired user bandwidth allocation.

The cyclic message monitor 6g causes the PLOAM grant generator 6e to produce PLOAM grants so that ONUs can send a class of messages produced on a regular basis. The downstream message monitor 6h watches outgoing downstream messages to detect a certain message requesting a specific ONU to send back a response, as well as its relevant ONU ID which specifies the destination ONU. When such message is detected, the downstream message monitor 6h causes the PLOAM grant generator 6e to produce a PLOAM grant signal.

The PLOAM cell transmitter 6i receives PLOAM grants from the PLOAM grant generator 6e, data grants from the data grant generator 6f, and outgoing messages from the priority controller 6p. It assembles PLOAM cells containing those pieces of information, controlling their sequence not to make them conflict with each other. The PLOAM cells produced as such are supplied to the MUX 5d for transmission.

The downstream message generator 6j produces downstream messages addressed to individual ONUs. Those produced messages include cyclic messages, time-critical messages, and non-critical messages, which are supplied to the cyclic message buffer 6k, time-critical message buffer 6m, and non-critical message buffer 6n, respectively. The cyclic message buffer 6k accumulates cyclic messages selectively from among those produced by the downstream message generator 6j. The time-critical message buffer 6m accumulates time-critical messages selectively from among those produced by the downstream message generator 6j. The non-critical message buffer 6n accumulates non-critical messages selectively from among those produced by the downstream message generator 6j.

The message priority controller 6p reads out messages from the cyclic message buffer 6k, time-critical message buffer 6m, or non-critical message buffer 6n, depending on predetermined priority levels assigned to them. The messages read out in this way are then supplied the PLOAM cell transmitter 6i. When a plurality of messages addressed to different ONUs have the same priority level, the message priority controller 6p coordinates the transmission of those messages so that all their recipients will be treated evenly. Although not shown in FIG. 1, a plurality (n) of ONUs #1 to #n are assumed to be coupled to the OLT in this embodiment of the present invention.

Figure 2:
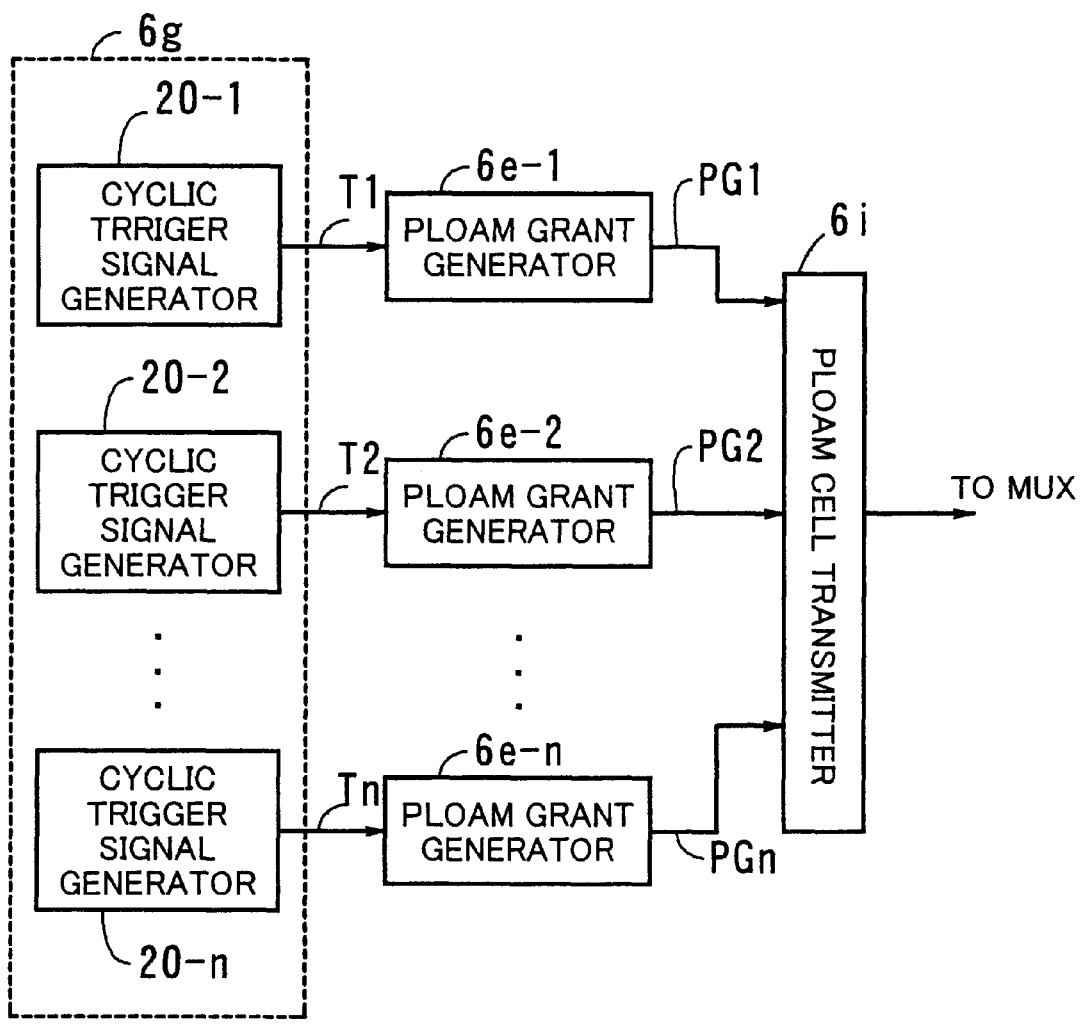
FIG. 2 is a block diagram which shows the details of a cyclic message monitor and its related elements shown in FIG. 1.

The elements of the proposed OLT have been briefly described above, and the following section will now present their more detailed structures and operations. Referring first to FIG. 2, the cyclic message monitor 6g and its related elements shown in FIG. 1 will be described in more detail below.

FIG. 2 is a detailed block diagram showing the cyclic message monitor 6g, PLOAM grant generator 6e, and PLOAM cell transmitter 6i. The cyclic message monitor 6g comprises a plurality of cyclic trigger signal generators 20-1 to 20-n. The PLOAM grant generator 6e comprises a plurality of PLOAM grant generators 6e-1 to 6e-n, which are coupled to the cyclic trigger signal generators 20-1 to 20-n, respectively.

The cyclic trigger signal generators 20-1 to 20-n produce trigger signals T1 to Tn, keeping pace with the transmission of cyclic messages by the ONUs #1 to #n, respectively, and the produced trigger signals are supplied to the PLOAM grant generators 6e-1 to 6e-n. This is possible because the OLT has prior information about at what intervals each ONU #1 to #n produces cyclic messages. With such a knowledge, the OLT determines trigger signal intervals of the cyclic trigger signal generators 20-1 to 20-n. The PLOAM grant generators 6e-1 to 6e-n produce PLOAM grant signals PG1 to PGn upon receipt of the trigger signals T1 to Tn from the cyclic trigger signal generators 20-1 to 20-n. Their output signals PG1 to PGn are then supplied to the PLOAM cell transmitter 6i. The PLOAM cell transmitter 6i sends those PLOAM grants to the multiplexer (MUX) 5d.

Figure 3:
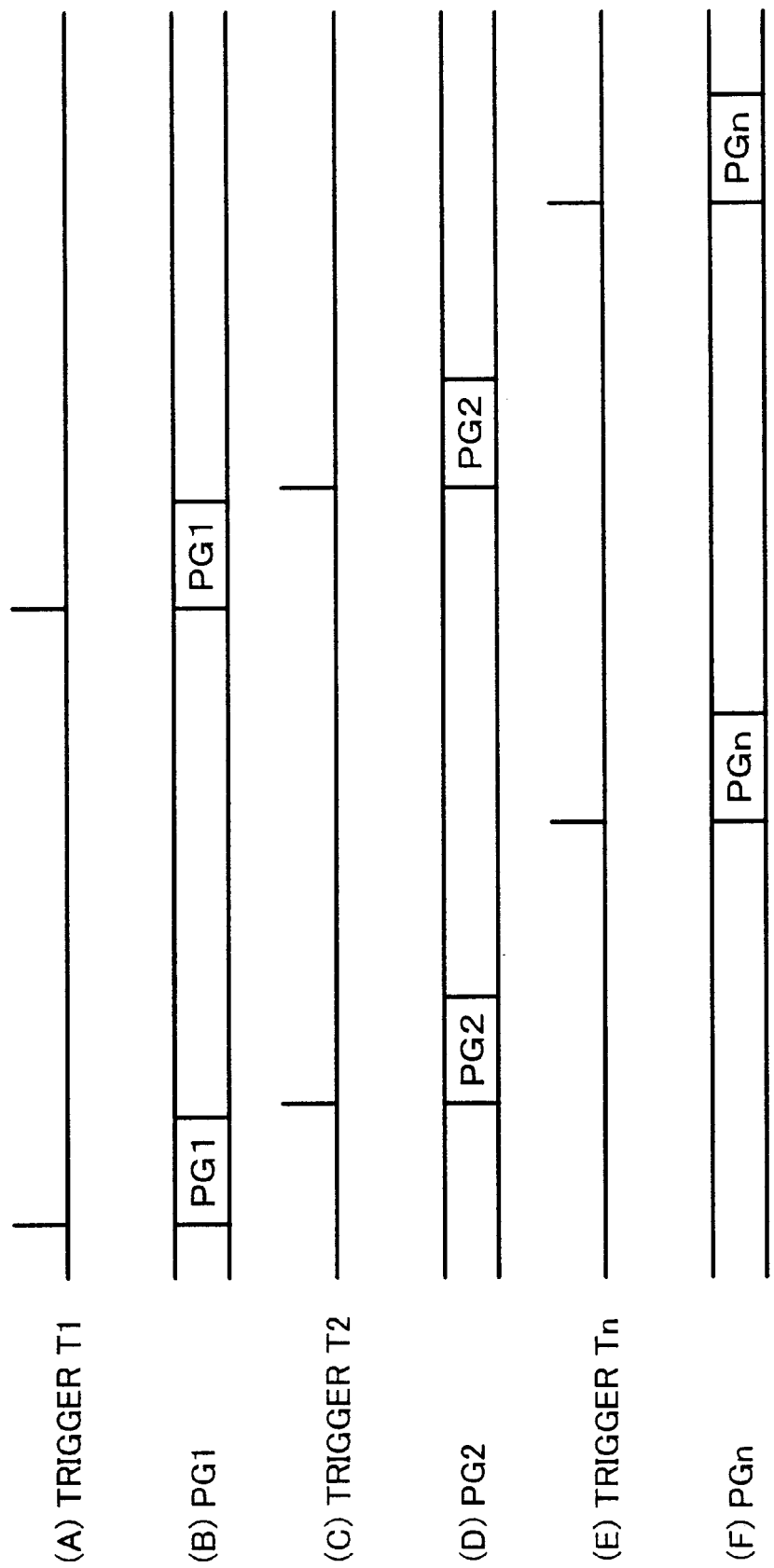
FIG. 3 is a timing diagram which explains the operation of the embodiment shown in FIG. 2.

Referring next to FIG. 3, the operation of the embodiment of FIG. 2 will be described below. FIG. 3 is a timing diagram which explains how the circuit of FIG. 2 works. As seen from the trigger signal waveforms (A), (C), and (E), the cyclic trigger signal generators 20-1 to 20-n produce trigger signals T1 to Tn at the same intervals as the ONUs #1 to #n produce their cyclic messages. Note that the trigger signals T1 to Tn have difference phases so that they will not coincide with each other.

The cyclic trigger signal generator 20-1, for instance, produces trigger pulses T1 as shown in (A) of FIG. 3. In response to each of them, the PLOAM grant generator 6e-1 supplies the PLOAM cell transmitter 6i with a corresponding PLOAM grant PG1 as shown in (B) of FIG. 3. The other cyclic trigger signal generators 20-2 to 20-n will generate trigger pulses T2 to Tn in the same way, causing their corresponding PLOAM grant generators 6e-2 to 6e-n to produce PLOAM grants PG2 to PGn accordingly. The PLOAM cell transmitter 6i inserts those PLOAM grants PG1 to PGn into PLOAM cells and sends them out to the ATM-PON network.

In the embodiment of the invention described above, the OLT issues PLOAM grants in harmonization with cyclic messages, a class of messages that ONUs produce on a regular basis. The above-described feature ensures that the OLT can collect messages of this class completely.

Figure 4:
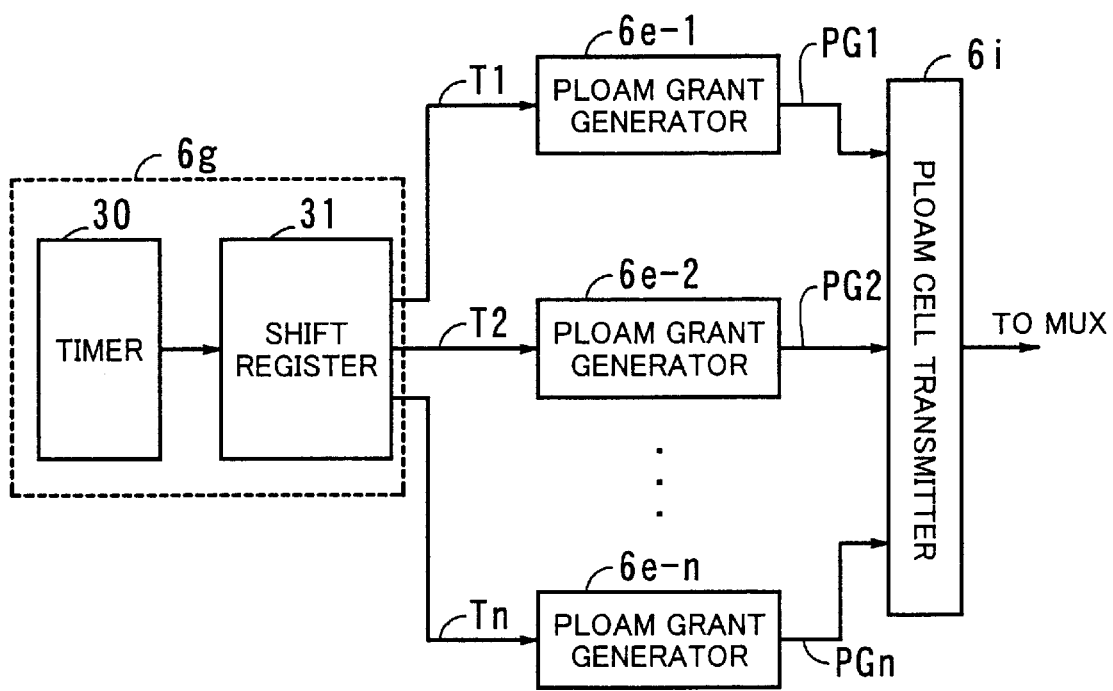
FIG. 4 is a block diagram which shows another implementation of the cyclic message monitor in detail, together with its related elements.

Referring next to FIG. 4, another implementation of the cyclic message monitor 6g and its related elements will be explained in detail below. FIG. 4 is a detailed block diagram showing the cyclic message monitor 6g, PLOAM grant generator 6e, and PLOAM cell transmitter 6i shown in FIG. 1. In contrast to the instance shown in FIG. 2, the cyclic message monitor 6g has a different structure, comprising a timer 30 and a shift register 31, instead of having a plurality of cyclic trigger signal generators. In his alternate configuration, the timer 30 generates trigger pulses at the same intervals as the ONUs produces cyclic messages. The shift register 31 has multiple stages each of which gives a phase shift equivalent to one message interval. Thus the shift register 31 successively shifts the trigger pulses supplied by the timer 30, thereby producing trigger signals T1 to Tn for the use in the PLOAM grant generators 6e-1 to 6e-n. In response to the trigger signals T1 to Tn supplied from the shift register 31, the PLOAM grant generators 6e-1 to 6e-n produce PLOAM grants PG1 to PGn, respectively. The produced PLOAM grants PG1 to PGn are then supplied to the PLOAM cell transmitter 6i, which sends the grants to the multiplexer (MUX) 5d.

Figure 5:
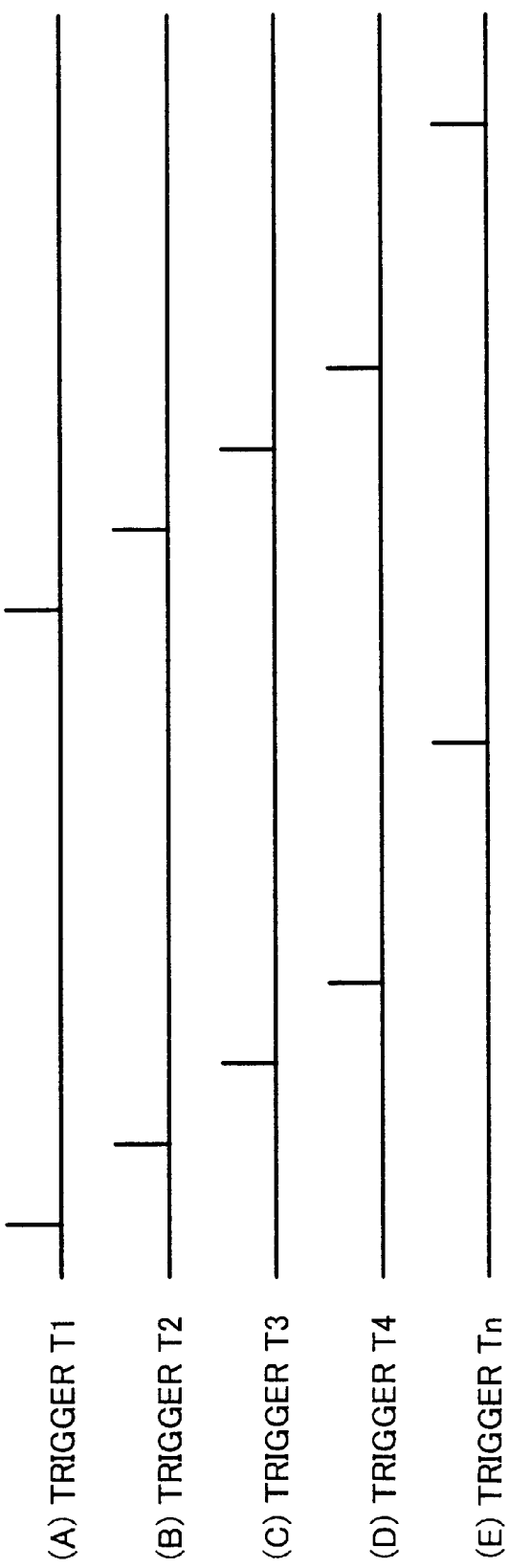
FIG. 5 is a timing diagram which explains the operation of the embodiment shown in FIG. 4.

The operation of the above-described embodiment will now be explained below. FIG. 5 is a timing diagram which explains the operation of the embodiment of FIG. 4. The timer 30 generates trigger pulses T1 as shown in (A) of FIG. 5. The shift register 31 successively shifts this trigger signal T1 by one message interval for each, thereby yielding delayed trigger signals T2 to Tn (see (B) to (E) of FIG. 5). Those trigger signals T1 to Tn are directed to the PLOAM grant generators 6e-1 to 6e-n, respectively. That is, the trigger signal T2 is delayed from the trigger signal T1 by one message interval, and likewise, the other trigger signal T3 to Tn follow the original trigger signal T1 with the delay of two to (n−1) intervals, respectively. The PLOAM grant generators 6e-1 to 6e-n produce PLOAM grants PG1 to PGn corresponding to the trigger signals T1 to Tn supplied from the shift register 31, and feeds them to the PLOAM cell transmitter 6i. The PLOAM cell transmitter 6i inserts those PLOAM grants PG1 to PGn into PLOAM cells and sends them out to the ATM-PON network.

As in the previous embodiment of FIG. 2, the above-described embodiment of the invention ensures that the OLT thoroughly collects cyclic messages produced by the ONUs on a regular basis. Also, it prevents PLOAM grants from causing congestion when they are loaded to PLOAM cells, because it can control the time intervals of trigger signals T1 to Tn more reliably.

Figure 6:
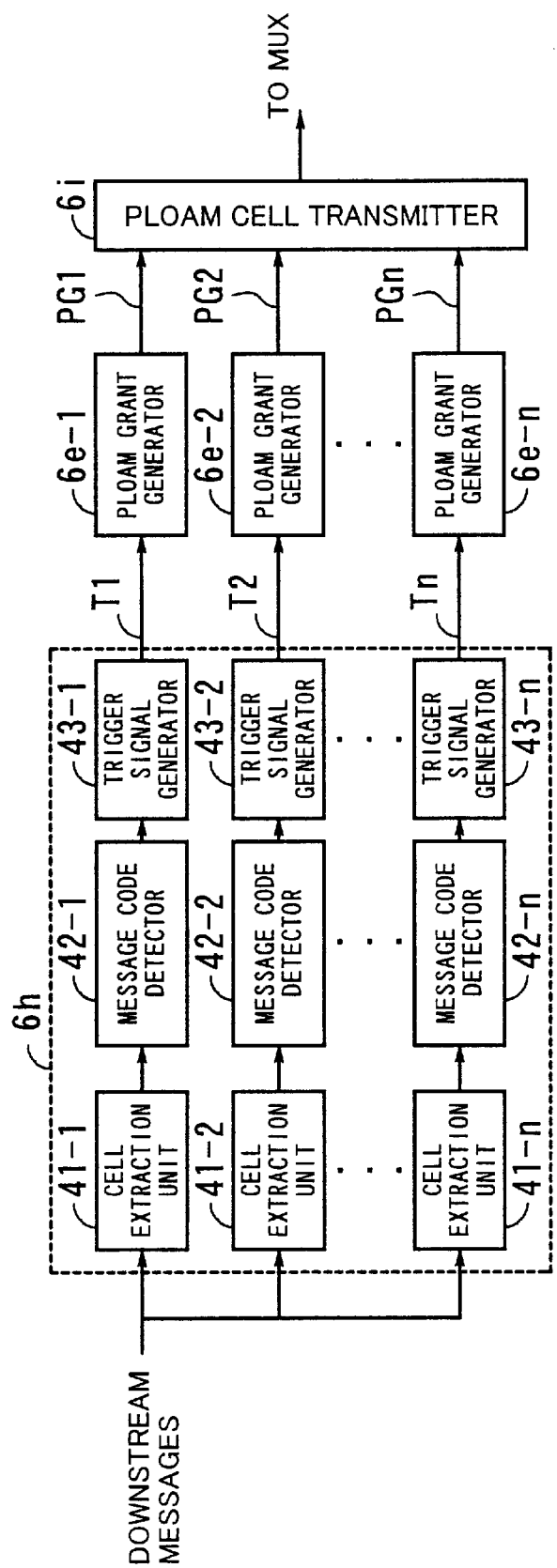
FIG. 6 is a block diagram which shows the details of a downstream message monitor and its related elements shown in FIG. 1.

Referring next to FIG. 6, the following section will describe the details of the downstream message monitor 6h and other related elements shown in FIG. 1.

FIG. 6 is a block diagram showing the details of the downstream message monitor 6h, PLOAM grant generator 6e, and PLOAM cell transmitter 6i explained in FIG. 1. As shown in FIG. 6, the downstream message monitor 6h comprises the following functional blocks: cell extractions units 41-1 to 41-n, message code detectors 42-1 to 42-n, and trigger signal generators 43-1 to 43-n.

As previously noted, the message priority controller 6p reads out downstream messages from the cyclic message buffer 6k, time-critical message buffer 6m, and non-critical message buffer 6n. The downstream message monitor 6h checks those messages, and if any of them require the destination ONUs to return a response, it then generates relevant trigger signals T1 to Tn to trigger their corresponding PLOAM grant generators 6e-1 to 6e-n. More specifically, the cell extraction units 41-1 to 41-n, associated with the ONUs #1 to #n, respectively, check the ONU ID field of each outgoing downstream message so as to extract PLOAM cells addressed to their associated ONUs. For example, the first cell extraction unit 41-1 extracts such cells whose destination ONU ID agrees with that of the ONU #1. With reference to each extracted message's identification code, the message code detectors 42-1 to 42-n determine whether there is any downstream message that requires its destination ONU to return a response. If such messages are found, they signal their corresponding trigger signal generators 43-1 to 43-n. The trigger signal generators 43-1 to 43-n provide their corresponding PLOAM grant generators 6e-1 to 6e-n with trigger signals T1 to Tn, when the message code detectors 42-1 to 42-n have detected that particular type of message codes mentioned above. The PLOAM grant generators 6e-1 to 6e-n produce PLOAM grants PG1 to PGn in response to the trigger signals T1 to Tn supplied from the trigger signal generators 43-1 to 43-n, respectively. The PLOAM cell transmitter 6i supplies the MUX 5d with the PLOAM grants PG1 to PGn, after inserting them into PLOAM cells.

Figure 7:
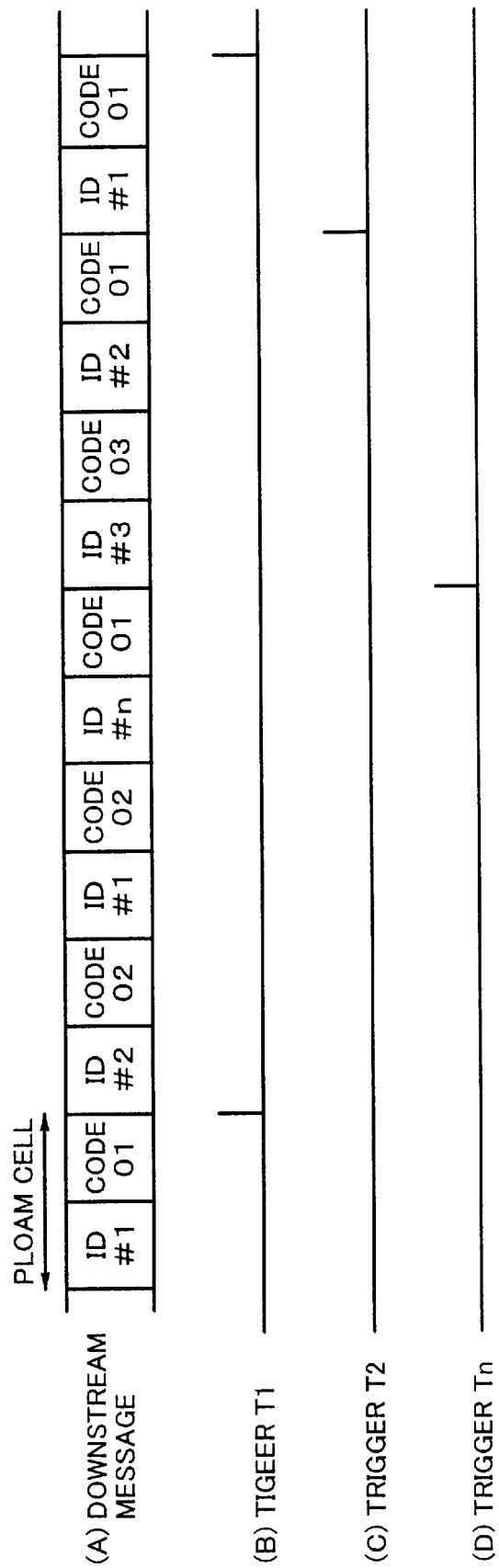
FIG. 7 is a timing diagram which explains the operation of the embodiment shown in FIG. 6.

The operation of the above-described embodiment will now be explained below. FIG. 7 is a timing diagram which explains the operation of the embodiment shown in FIG. 6. Suppose here that the downstream message monitor 6h receives a series of downstream messages as shown in (A) of FIG. 7, where each message contains an ONU ID that identifies a specific ONU, as well as a code that indicates a specific function of the message. Then the cell extraction units 41-1 to 41-n extract their relevant cells (i.e., PLOAM cells having ONU ID #1 to #n, respectively). The extracted cells are supplied to their corresponding message code detectors 42-1 to 42-n. The cell extraction unit 41-1, for instance, will extracts such cells having ID #1 (i.e., cells addressed to ONU #1) and supplies them to the message code detector 42-1.

Examining each extracted message, the message code detectors 42-1 to 42-n determine whether there is any downstream message that requires its destination ONU to return a response. If such messages are found, they signal to the trigger signal generators 43-1 to 43-n. Consider that, in the example of FIG. 7, the code "01" denotes that the receiving ONU should respond. When this code "01" is found in the cells supplied from the cell extraction units 41-1 to 41-n, the message code detectors 42-1 to 42-n request their corresponding trigger signal generators 43-1 to 43-n to produce a trigger signal. The trigger signal generators 43-1 to 43-n then produce trigger signals T1 to Tn as shown in (B) to (D) of FIG. 7, thereby activating the PLOAM grant generators 6e-1 to 6e-n. The PLOAM grant generators 6e-1 to 6e-n produce PLOAM grants PG1 to PGn corresponding to the trigger signals T1 to Tn supplied from the trigger signal generators 43-1 to 43-n, and feeds them to the PLOAM cell transmitter 6i. The PLOAM cell transmitter 6i inserts those PLOAM grants PG1 to PGn into PLOAM cells and sends them out to the ATM-PON network.

It should be noted that the downstream messages read out by the message priority controller 6p are also supplied directly to the PLOAM cell transmitter 6i for immediate transmission as PLOAM cells. While some of those messages derive PLOAM grants as a result of the above-described processing of the downstream message monitor 6h, such PLOAM grants have a certain amount of time delay because of that processing time. Accordingly, the PLOAM cell transmitter 6i always sends out a message first and then transmits its associated PLOAM grant. This sequence enables the receiving ONU to return its response message, using an upstream time slot specified by the subsequent PLOAM grant.

According to the above-described embodiment of the invention, downstream messages requiring response from ONUs will initiate transmission of PLOAM grants. Advantageously, the proposed OLT can receive response messages from ONUs more reliably, since it is ensured that every such message is immediately accompanied by a PLOAM grant.

Figure 8:
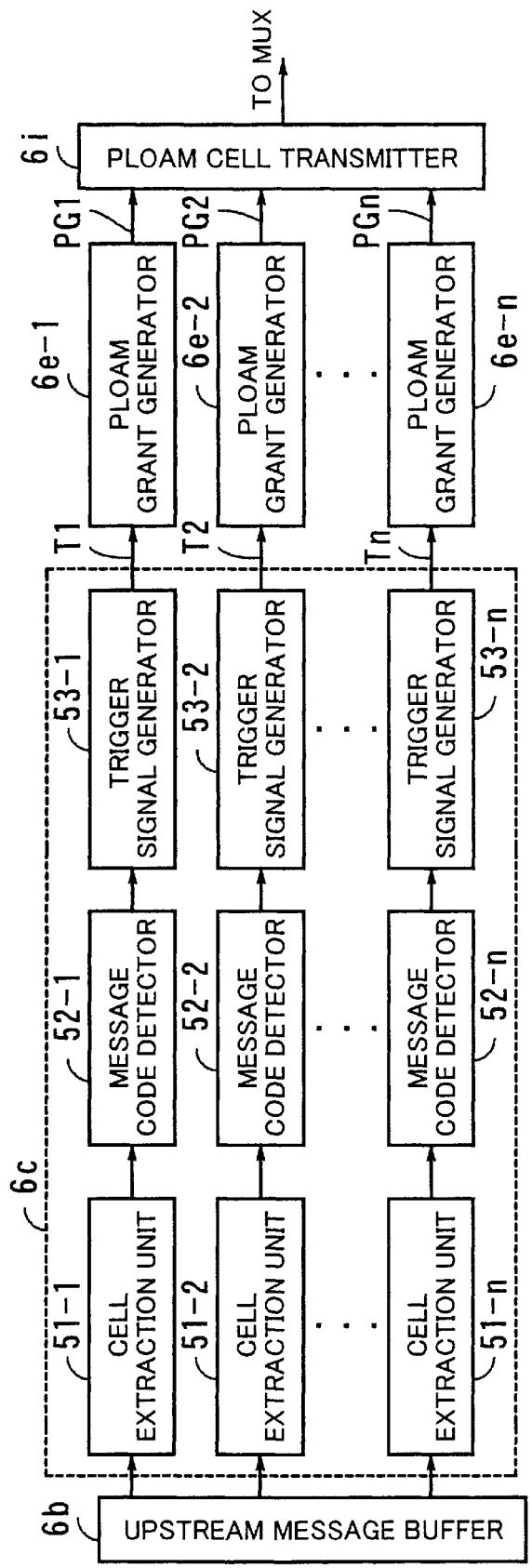
FIG. 8 is a block diagram which shows the details of an upstream message monitor and its related elements shown in FIG. 1.

Referring next to FIG. 8, the structure of the upstream message buffer 6b, upstream message monitor 6c, PLOAM grant generator 6e, and PLOAM cell transmitter 6i shown in FIG. 1 will be explained in detail below.

The upstream message monitor 6c comprises the following elements: cell extraction units 51-1 to 51-n, message code detectors 52-1 to 52-n, and trigger signal generators 53-1 to 53-n. Upstream messages received from ONUs #1 to #n are supplied to the upstream message monitor 6c via the upstream message buffer 6b. When upstream messages other than "no message" have arrived, the upstream message monitor 6c provides the relevant PLOAM grant generators 6e-1 to 6e-n with trigger signals T1 to Tn. This function is provided by the following structure.

Being associated with different ONUs #1 to #n, the cell extraction units 51-1 to 51-n extract messages having relevant PON IDs from among those supplied by the upstream message buffer 6b. For example, the first cell extraction unit 51-1 extracts such cells whose destination ONU ID is #1. The message code detectors 52-1 to 52-n test the codes contained in the upstream messages extracted by the cell extraction units 51-1 to 51-n. When they are other than "no message," the message code detectors 52-1 to 52-n indicate so to their associated trigger signal generators 53-1 to 53-n. In response to this, the trigger signal generators 53-1 to 53-n produce trigger signals T1 to Tn, and supply them to the PLOAM grant generators 6e-1 to 6e-n, respectively.

The PLOAM grant generators 6e-1 to 6e-n produce PLOAM grants PG1 to PGn upon receipt of the trigger signals T1 to Tn from the trigger signal generators 53-1 to 53-n. Their outcomes PG1 to PGn are then supplied to the PLOAM cell transmitter 6i. The PLOAM cell transmitter 6i supplies the MUX 5d with the PLOAM grants PG1 to PGn, after inserting them into PLOAM cells.

Figure 9:
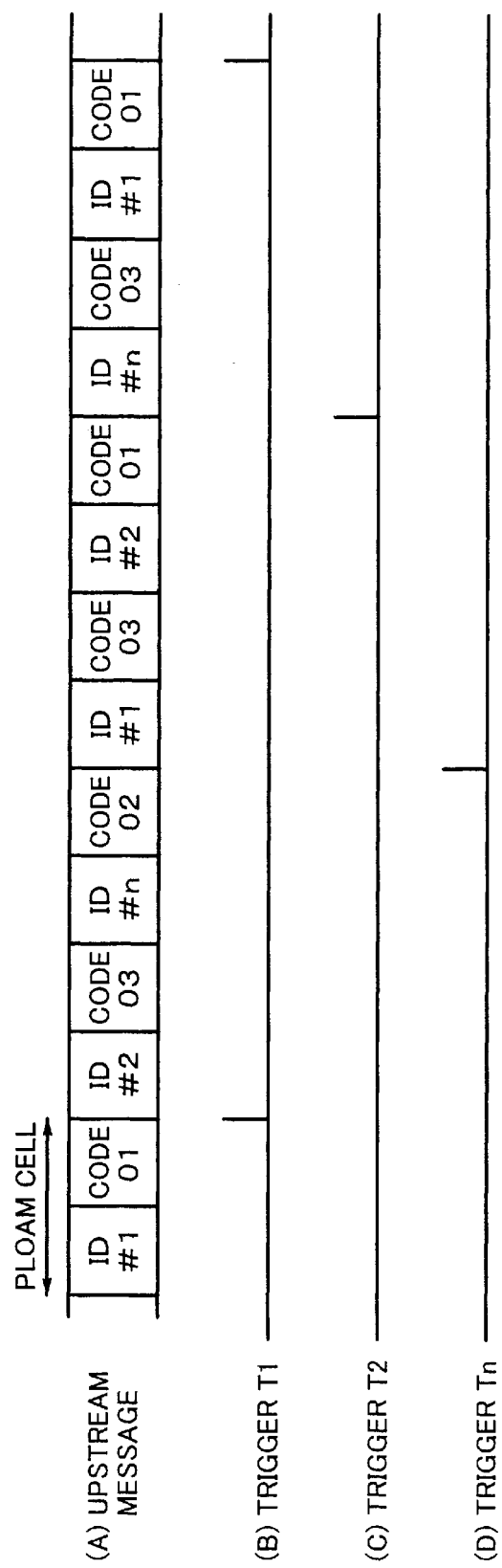
FIG. 9 is a timing diagram which explains the operation of the embodiment shown in FIG. 8.

The operation of the above-described embodiment is as follows. FIG. 9 is a timing diagram which shows the operation of the embodiment of FIG. 8. Suppose here that the upstream message buffer 6b supplies a series of upstream messages as shown in (A) of FIG. 9, where each message has a PON ID and a message identification code. In this situation, the cell extraction units 51-1 to 51-n extract cells having relevant PON IDs from among those supplied by the upstream message buffer 6b. For example, the cell extraction unit 51-1 extracts such cells whose PON ID is #1. The message code detectors 52-1 to 52-n test the codes contained in the upstream messages extracted by the cell extraction units 51-1 to 51-n. When they are other than "no message," the message code detectors 52-1 to 52-n direct the trigger signal generators 53-1 to 53-n to produce trigger signals T1 to Tn, respectively.

Suppose here that the code "03" means "no message," for instance. Then the message code detectors 52-1 to 52-n detect codes other than "03," thus causing the trigger signals T1 to Tn to be produced as shown in (B) to (D) of FIG. 9. The PLOAM grant generators 6e-1 to 6e-n now generate PLOAM grants PG1 to PGn accordingly and feed them to the PLOAM cell transmitter 6i. The PLOAM cell transmitter 6i supplies the MUX 5d with those PLOAM grants PG1 to PGn, after inserting them into PLOAM cells.

It should be noted that the PLOAM grant generators 6e-1 to 6e-n receive trigger signals T1 to Tn not only from the upstream message monitor 6c (FIG. 8), but from the cyclic message monitor 6g (FIG. 2) and downstream message monitor 6h (FIG. 6) as well. The presence of those multiple trigger sources, however, might cause some congested situations. To work around this problem, the PLOAM grant generators 6e-1 to 6e-n are designed to resolve overlapping trigger signals, if occurred, by giving a higher priority to the trigger signals from the cyclic message monitor 6g (FIG. 2) and downstream message monitor 6h (FIG. 6), while discarding those from the upstream message monitor 6c (FIG. 8). This prioritization can be implemented as a simple logic circuit, which supplies the PLOAM grant generators 6e-1 to 6e-n with the logical products of the trigger signals of FIG. 8 and the inverted sum of the trigger signals of FIGS. 2 and 6. Even if some trigger signals shown in FIG. 8 are discarded, they can be asserted again since the next upstream PLOAM cells convey messages other than "no message."

According to the above-described embodiment of the invention, the proposed OLT issues a PLOAM grant when it receives an upstream message other than "no message." This feature makes it possible for the OLT to receive response messages from ONUs in a more reliable manner. The proposed approach, in turn, means that no PLOAM grants are to be sent in the case of "no message." This policy will allow other ONUs to have more chances to transmit their messages, thus making them less likely to discard their local information.

Figure 10:
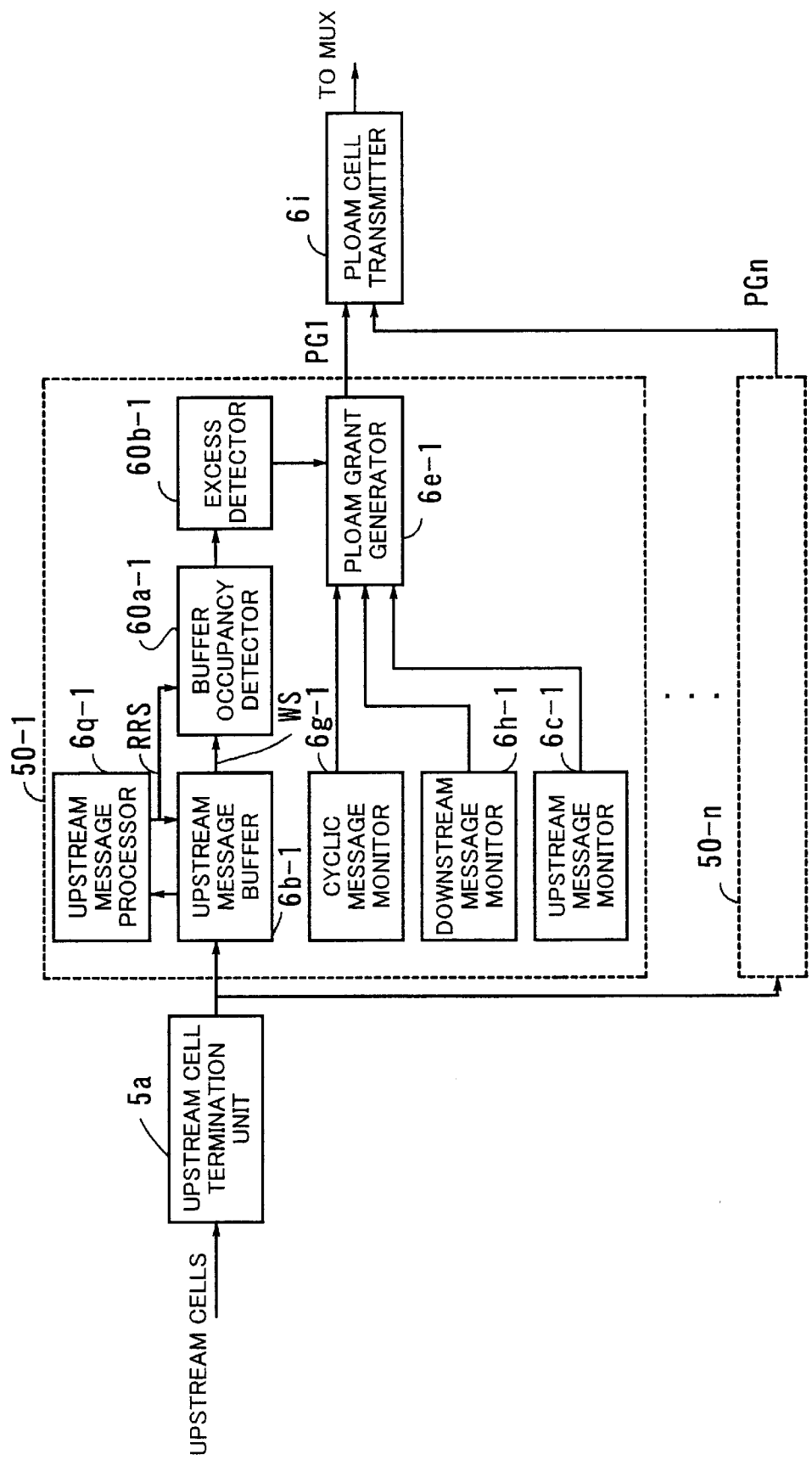
FIG. 10 is a block diagram which shows the details of a buffer monitor and its related elements shown in FIG. 1.

Referring next to FIG. 10, the following section will describe the detailed structure of the upstream cell termination unit 5a, upstream message buffer 6b, upstream message monitor 6c, PLOAM grant generator 6e, and PLOAM cell transmitter 6i shown in FIG. 1. For simplicity, FIG. 10 omits the buffer monitor 6d. Also, FIG. 10 selectively shows a functional block 50-1 corresponding to ONU #1. Although FIG. 10 does not provide the details of functional blocks 50-2 to 50-n for ONUs #2 to #n, it will be appreciated that they have the same structure as the functional block 50-1. Under this assumption, the following explanation will focus on the functional block 50-1.

In the embodiment of FIG. 10, the functional block 50-1 comprises: an upstream message processor 6q-1, an upstream message buffer 6b-1, a buffer occupancy detector 60a-1, an excess detector 60b-1, an upstream message monitor 6c-1, a PLOAM grant generator 6e-1, a cyclic message monitor 6g-1, and a downstream message monitor 6h-1. The upstream cell termination unit 5a receives upstream cells sent from ONUs and supplies them to the upstream message buffers 6b-1 to 6b-n (partly not shown). The upstream message buffer 6b-1 in the functional block 50-1 stores upstream cells sent from the ONU #1. Those cells have been collected from among those supplied from the upstream cell termination unit 5a, with reference to each cell's a PON ID field that indicates which ONU transmitted it. The upstream message processor 6q-1 reads out messages from the upstream message buffer 6b-1 in a sequential fashion, and it executes an appropriate process, while parsing the message identification code contained in each message.

The buffer occupancy detector 60a-1 comprises an up/down counter (not shown) which is incremented by one when the upstream message buffer 6b-1 receives a new message and decremented by one when a stored message is read out of the buffer 6b-1. The former event is indicated by the assertion of the buffer's write enable signal WS, while the latter event is indicated by the assertion of the read request signal RRS. Through the above up/down counting operations, the resulting count values of the buffer occupancy detector 60a-1 will show the amount of messages accumulated in the upstream message buffer 6b-1. The excess detector 60b-1 determines whether the count value of the buffer occupancy detector 60a-1 exceeds a predetermined threshold. If it exceeds the threshold, the excess detector 60b-1 notifies the PLOAM grant generator 6e-1 of the excess.

The PLOAM grant generator 6e-1 responds to the excess notification from the excess detector 60b-1 by generating a PLOAM grant, based solely on the trigger signal supplied from the cyclic message monitor 6g-1. Note here that it neglects the like signals from the downstream message monitor 6h-1 or upstream message monitor 6c-1. The PLOAM cell transmitter 6i receives the produced PLOAM grants PG1 to PGn from the functional blocks 50-1 to 50-n. It supplies the MUX 5d with those PLOAM grants, after inserting them into PLOAM cells.

In the above structure, the PLOAM grant generator 6e-1 would exceptionally accept and process trigger signals from the cyclic message monitor 6g-1, even if an excessive buffer occupancy level is observed. This is because the OLT must send PLOAM grants at predetermined intervals to receive cyclic messages from ONUs. In addition, the threshold given to the excess detector 60b-1 should be below the maximum capacity of the upstream message buffer 6b-1.

The operation of the above-described embodiment will now be explained below, assuming that the threshold given to the excess detector 60b-1 is "2" for illustrative purposes.

Figure 11:
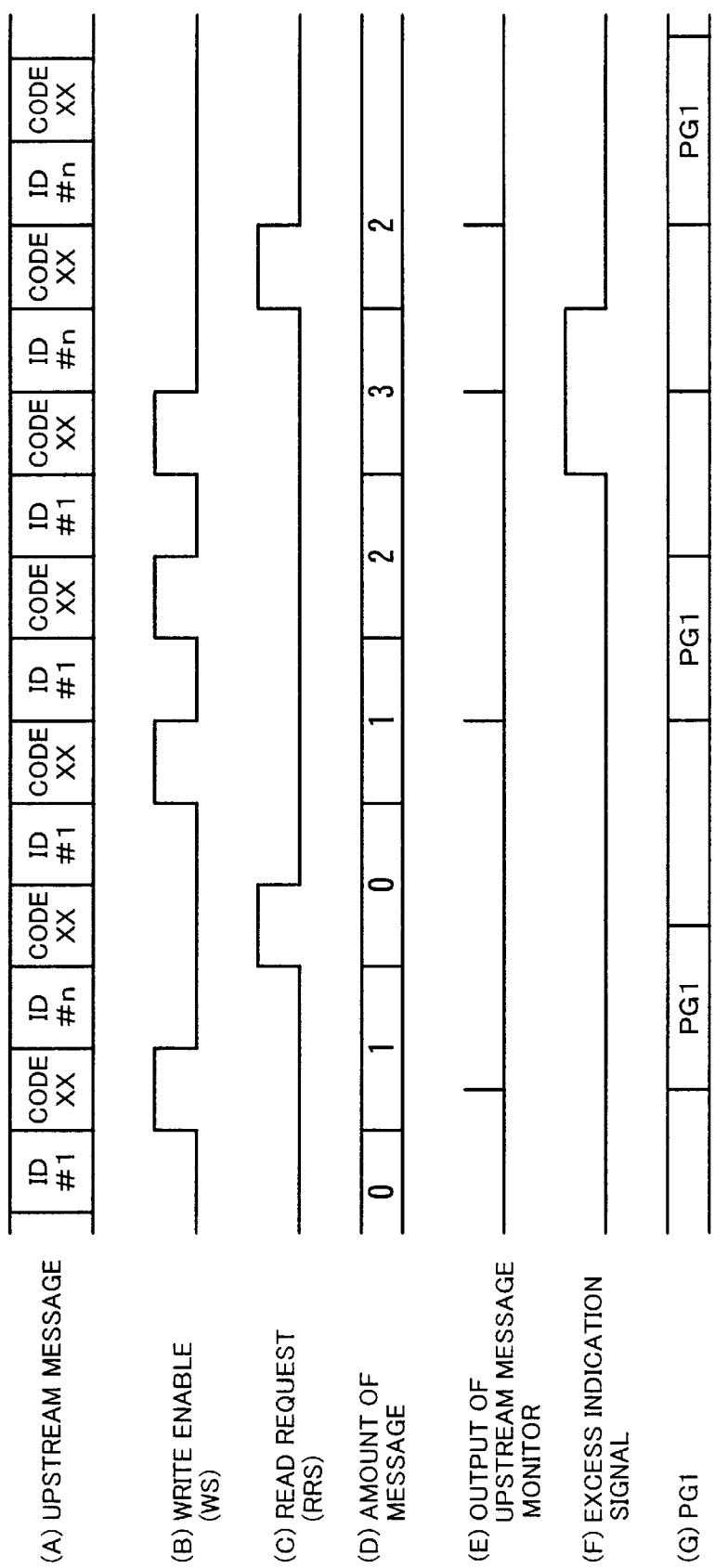
FIG. 11 is a timing diagram which explains the operation of the embodiment shown in FIG. 10.

FIG. 11 is a timing diagram which explains the operation of the embodiment of FIG. 10. Suppose that the upstream cell termination unit 5a receives a series of upstream message as shown in (A) of FIG. 11, each of which comprises a PON ID and a message identification code. The upstream message buffers in the functional blocks 50-1 to 50-n extract and accumulate message cells carrying their relevant PON IDs. Take the functional block 50-1 for example. The upstream message buffer 6b-1 in this block extracts such cells whose PON ID field exhibits "#1."

Each time a relevant cell is saved into the upstream message buffer 6b-1, the write enable signal WS becomes active, or high level state, as shown in (B) of FIG. 11. This leads to the count value of "1" as shown in (D) of FIG. 11, since the buffer occupancy detector 60a-1 performs an up-counting operation. On the other hand, the upstream message processor 6q-1 asserts the read request signal RRS as shown in (C) of FIG. 11. This causes the buffer occupancy detector 60a-1 to perform a down-counting operation, thus making the count value return to "0."

FIG. 11 further shows that the buffer occupancy detector 60a-1 increases its count value up to "3" after accepting four write enable pulses WS. At this stage, the excess detector 60b-1 sets the excess indication signal to high as shown in (F) of FIG. 11, since the count value exceeds the threshold "2." Consequently, the PLOAM grant generator 6e-1 neglects the activated output signal of the upstream message monitor 6c-1 (see (E) of FIG. 11). That is, it temporarily suppresses the generation of a PLOAM grant as shown in (G) of FIG. 11. Note again that this suppression of PLOAM grants, however, does not apply to the requests from the cyclic message monitor 6g-1. After that, the upstream message processor 6q-1 produces another read request signal RRS, which directs the buffer occupancy detector 60a-1 to decrease its count value to "2." Then the excess detector 60b-1 negates the excess indication signal to low, enabling the PLOAM grant generator 6e-1 to restart issuing PLOAM grants.

According to the above-described embodiment of the invention, the proposed OLT has a buffer occupancy detector 60a-1 to observe how many messages are accumulated in the upstream message buffer 6b-1. When the buffer occupancy level exceeds a predetermined threshold, the excess detector 60b-1 notifies the PLOAM grant generator 6e-1 of the event. As a result, the PLOAM grant generator 6e-1 suppresses further issuance of PLOAM grants, unless it is requested by the cyclic message monitor 6g-1. Controlling the upstream message traffic in this way, the present invention prevents the upstream message buffer 6b-1 from overflowing, while still accepting cyclic messages from ONUs.

Figure 12:
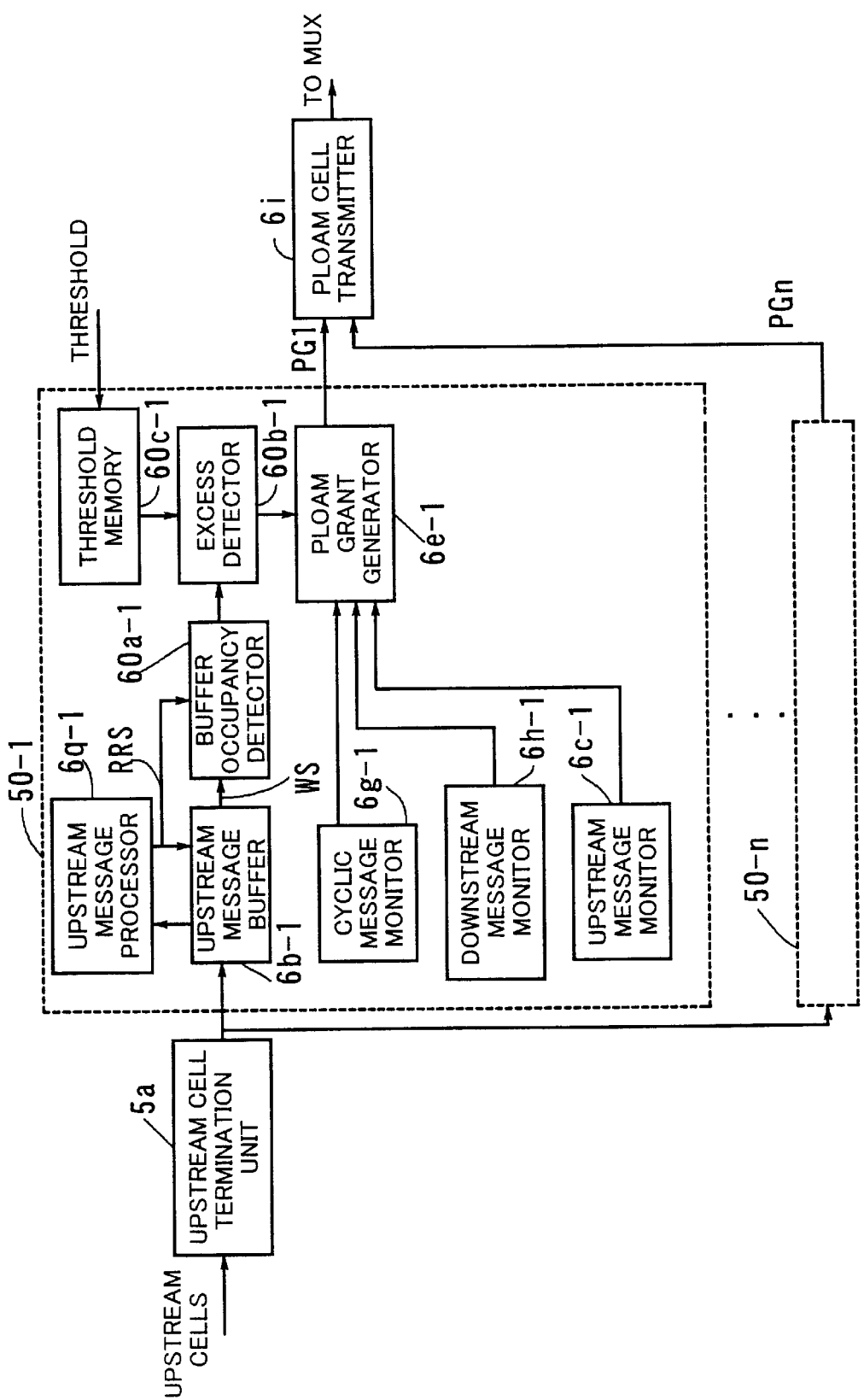
FIG. 12 is a block diagram which shows the details of a buffer monitor and its related elements shown in FIG. 1.

Referring next to FIG. 12, the following section will provide the details of the upstream cell termination unit 5a, upstream message buffer 6b, upstream message monitor 6c, PLOAM grant generator 6e, and PLOAM cell transmitter 6i shown in FIG. 1. Since the structure shown in this FIG. is similar to that of FIG. 10, the following explanation will focus on its distinctive elements, while affixing like reference numerals to like elements.

The embodiment of FIG. 12 differs from that of FIG. 10 in that a threshold memory 60c-1 is newly employed, while other elements are the same as those explained in FIG. 10. This threshold memory 60c-1 stores the threshold value that the excess detector 60b-1 uses for comparison. The threshold value is loaded to the excess detector 60b-1 on demand. The value can also be updated from an external source.

The above-described structural arrangement makes it possible to reconfigure the functional block 50-1 with the most appropriate threshold value depending on the maximum capacity of the upstream message buffer 6b-1 and other related system environments (e.g., the number of supported ONUs). That is, an optimal control can be achieved by tuning the threshold in accordance with the actual hardware configuration and system environment.

Figure 13:
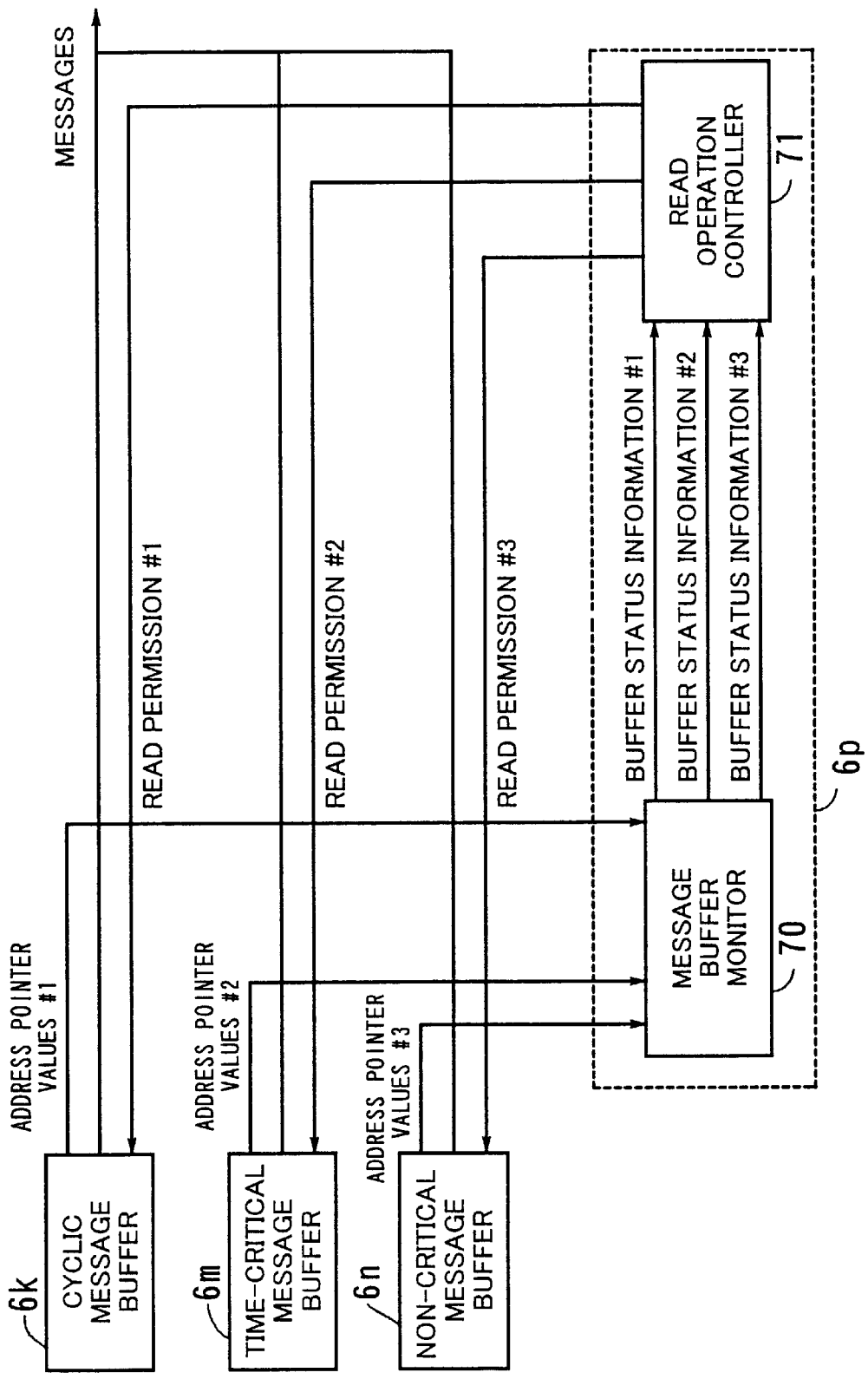
FIG. 13 is a block diagram which shows the details of a message priority controller and its related elements shown in FIG. 1.

Referring next to FIG. 13, the following section will provide the detailed structure and operation of the cyclic message buffer 6k, time-critical message buffer 6m, non-critical message buffer 6n, and message priority controller 6p shown in FIG. 1. As seen from FIG. 13, the message priority controller 6p comprises a message buffer monitor 70 and a read operation controller 71.

The message buffers 6k, 6m, and 6n are random access memories (RAMs) each configured to function as FIFO storage with a write and read address pointers (not shown). The two pointers point at the same address while no messages are stored. Each message buffer accepts new message entries by writing each message and advancing the write address pointer accordingly. When they output messages, the read address pointer is advanced in accordance with the relevant data sizes.

The message buffer monitor 70 figures out how much message data is accumulated in each message buffer by calculating the distance between the write address and read address of each buffer. Such status information, referred to as the buffer status information #1 to #3, is provided to the read operation controller 71. The read operation controller 71 uses those buffer status information #1 to #3 to supply the message buffers with read permissions #1 to #3 according to some predetermined algorithms. More specifically, the read operation controller 71 revokes the read permissions #2 and #3 (i.e., disables reading operations), when the read permission #1 is active (i.e., messages are available in the cyclic message buffer 6k). It also revokes the read permission #3 when the read permission #2 is active. This means that the messages in the three buffers are prioritized in the order of cyclic messages (highest), time-critical messages (medium), and non-critical messages (lowest), and the read operation controller 71 reads them out of the buffers on the basis of their respective priority levels.

The operation of the above-described embodiment is as follows. Suppose here that the cyclic message buffer 6k currently has two messages, and that the time-critical message buffer 6m and non-critical message buffer 6n have one message in each. These three message buffers 6k, 6m, and 6n output address pointer values #1 to #3 depending on their respective storage conditions. The message buffer monitor 70 figures out the amount of messages accumulated in each message buffer by calculating the distance between the write address and read address of each buffer. In the present example, the address pointer values #1 from the cyclic message buffer 6k indicate that the amount of messages is currently "2," while the address pointer values #2 and #3 from the time-critical message buffer 6m and non-critical message buffer 6n indicate that the amount of messages is "1." The message buffer monitor 70 then supplies the read operation controller 71 with the above information, i.e., the buffer status information #1 to #3. The read operation controller 71 uses the buffer status information #1 to #3 to produce read permissions #1 to #3 for the respective message buffers.

In the present context, the buffer status information #1 exhibits the value of "2," which suggests that some highest-priority messages are available. The read operation controller 71 thus grants a read permission #1 to the cyclic message buffer 6k, while giving no permission to the other message buffers 6m and 6n. Consequently, one message is read out of the cyclic message buffer 6k and sent to the PLOAM cell transmitter 6i. It is then transmitted as a downstream message to its destination ONU through the MUX 5d.

Now that one message has been sent out, the address pointer values #1 indicates a new read address (i.e., incremented by one). This causes the message buffer monitor 70 to change the buffer status information #1 from "2" to "1." This buffer status information #1, however, still indicates the presence of a message with the highest-priority. Therefore, the read operation controller 71 continuously asserts the read permission #1, while keeping the other read permissions #2 and #3 negated. The above process is thus repeated, and the second message in the cyclic message buffer 6k is sent out. Since all the pending messages have gone out of the cyclic message buffer 6k, the read operation controller 71 now grants a read permission #2 to the time-critical message buffer 6m to initiate message transmission. When the message in the time-critical message buffer 6m is transmitted, a read permission #3 is granted to the non-critical message buffer 6n, initiating transmission of lowest-level messages.

The above-described sequence may, however, be interrupted by write operations. In that case, the address pointer values should be updated after the ongoing reading operation is finished. The message buffer monitor 70 then should recalculate a new set of buffer status information #1 to #3 according to the updated address pointer values #1 to #3, and the read operation controller 71 controls the buffer read operations with reference to the latest buffer status information #1 to #3.

According to the above-described embodiment of the invention, the controller 6 gives successively lower priority levels to cyclic messages, time-critical messages, and non-critical messages, and the messages are queued and transmitted to ONUs according to their priority levels. Therefore, the proposed OLT can transmit cyclic messages and time-critical messages in a more reliable fashion, even in a congested condition where many transmission requests are waiting services.

Figure 14:
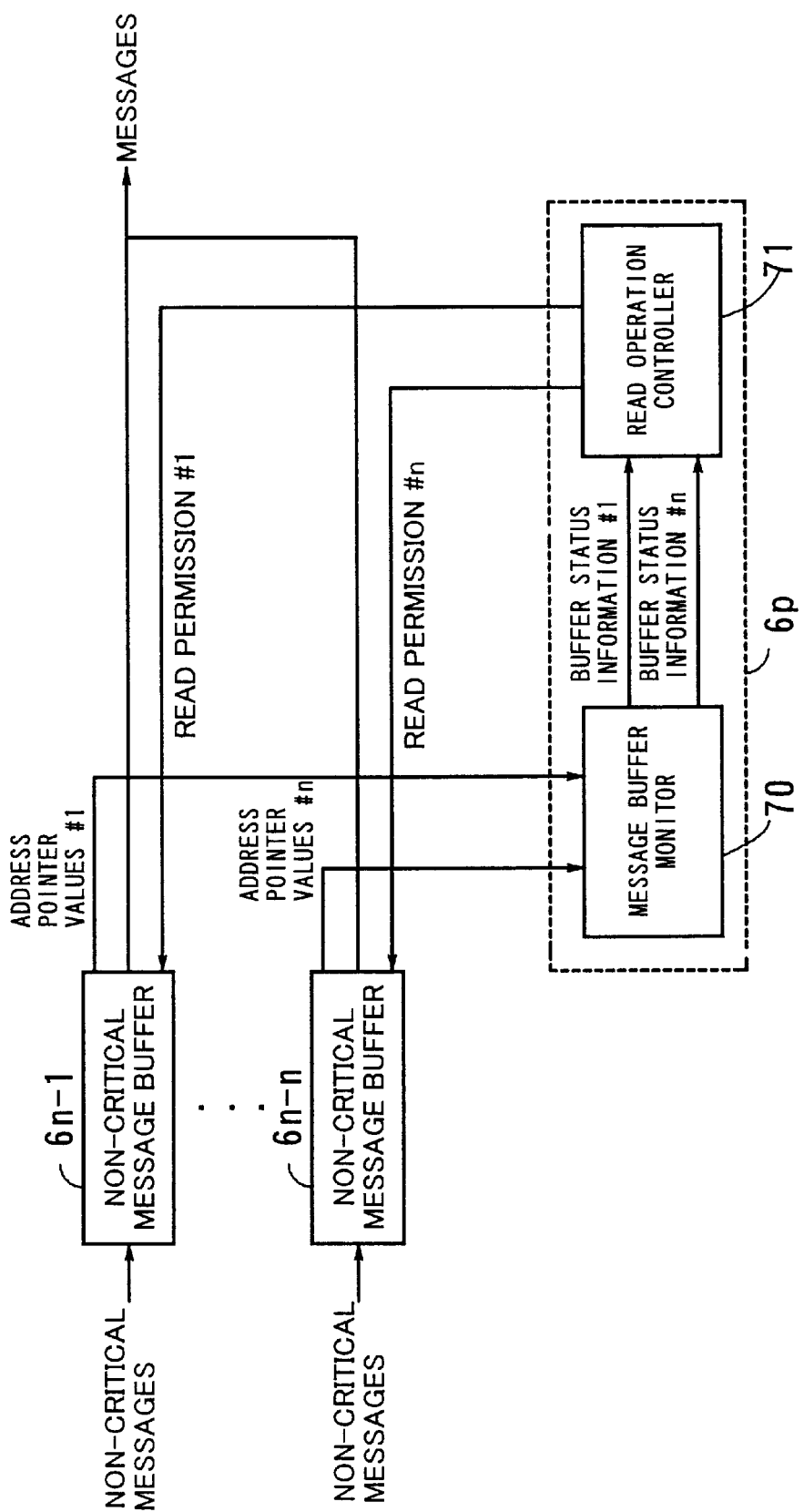
FIG. 14 is a block diagram which shows more details of the message priority controller and its related elements shown in FIG. 1.

Referring next to FIG. 14, a more detailed configuration of the embodiment of FIG. 13 will be described below. FIG. 14 shows the details of the non-critical message buffer 6n, message buffer monitor 70 and read operation controller 71 shown in FIG. 13. Here, a plurality of non-critical message buffers 6n-1 to 6n-n store non-critical messages addressed the ONUs #1 to #n, respectively. Supplied with address pointer values #1 to #n from the non-critical message buffers 6n-1 to 6n-n, the message buffer monitor 70 calculates the distance between the write and read addresses of each buffer. This yields buffer status information #1 to #n each representing the number of messages stored in the corresponding message buffer. With reference to this information, the read operation controller 71 arranges the order of outgoing messages to be read out of the non-critical message buffers 6n-1 to 6n-n, so that all ONUs will receive messages equally.

The operation of the above-described embodiment is as follows. Assume here that the non-critical message buffers 6n-1 to 6n-n are all empty. In this situation, consider that two non-critical messages directed to ONU #1 and ONU #5 are supplied. These messages are stored into the non-critical message buffer 6n-1 and non-critical message buffer 6n-5. The message buffer monitor 70 now outputs "1" as the value of buffer status information #1, because the address pointer values #1 indicates that its relevant pointer distant is "1." The message buffer monitor 70 does the same for the address pointer values #5 and buffer status information #5.

The read operation controller 71 has an integral modulo-n counter to test whether the buffer status information corresponding to its count value is zero. That is, the counter values is used as an incremental index in scanning the buffer status information #1 to #n, permitting the read operation controller 71 to reach a valid instance that exhibits a non-zero value. The counter value is held if there is no valid (non-zero) buffer status information. If any valid buffer status information is found, the read operation controller 71 grants a read permission to the relevant non-critical message buffer, thereby initiating a read access to that buffer. It also stops the counter until the next scheduled time slot comes. The read operation controller 71 repeats the above actions at every message transmission timing, incrementing the modulo-n counter. The count value ranges from "1" to "n" and it returns to "1" after reaching "n."

In the present example, the read operation controller 71 operates its integral counter since there are valid instances of buffer status information. First, when the counter indicates "1," it grants a read permission #1 to the first non-critical message buffer 6n-1. Consequently, the non-critical message buffer 6n-1 outputs its entry to the PLOAM cell transmitter 6i. A few cycles later, the counter reaches the value of "5" and causes the non-critical message buffer 6n-5 (not shown) to output another message to the PLOAM cell transmitter 6i. The counter stops at "5" since no messages are stored in other message buffers 6n-6 to 6n-n. When a new message comes, the counter resumes from "6" to continue scanning the buffers.

According to the above-described embodiment of the invention, the proposed read operation controller 71 searches message buffers to find a next message to send. This search is designed to begin with a non-critical message buffer which comes next to the previous one. It is therefore possible to evenly use all non-critical message buffers disposed in the OLT.

The above embodiment of FIG. 14 has assumed that the non-critical messages include some different kinds of messages, but have the same priority level. In the case that those messages should be handled with different priority levels, the previous embodiment explained in FIG. 13 would work. That is, the non-critical message buffer would be divided into as many sub-buffers as the priority levels.

Further, the above embodiment of FIG. 14 has illustrated a structure related to non-critical messages. This structure, however, does not apply to cyclic messages or time-critical messages, because the messages of these classes require transmission at a predetermined time or within a certain time limit. Instead, those messages are written into message buffers after making necessary arbitration.

Figure 15:
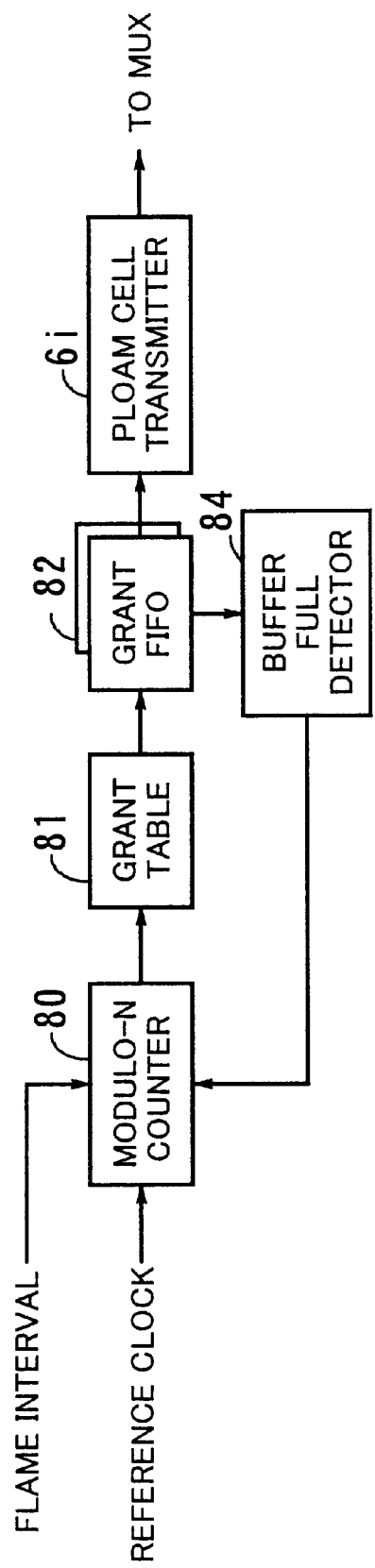
FIG. 15 is a block diagram which shows the details of a data grant generator and its related elements shown in FIG. 1.

Referring next to FIG. 15, the following section will now present the details of the data grant generator 6f and PLOAM cell transmitter 6i shown in FIG. 1.

The data grant generator 6f comprises: a modulo-n counter 80, a grant table 81, a grant FIFO 82, and a buffer full detector 84. Being enabled when a frame starts, the modulo-n counter 80 increases its count value at the rate of a given reference clock, and returns to the initial value "1" after reaching the maximum count "n." The modulo-n counter 80 is stopped by a buffer-full signal provided by the buffer full detector 84, and holds its current value until the next frame starts. The grant table 81 stores data grant values corresponding to addresses 1 to n. The data grants have unique values that are previously assigned to individual ONUs to identify which ONUs are permitted to send an upstream cell. The modulo-n counter 80 provides the grant table 81 with its count value as the addressing information for retrieving a specific data grant value.

The allocation of data grants are determined in accordance with the allocation of user bandwidth resources which are shared by the ONUs on a network. Think of an ATM-PON system serving three ONUs #1 to #3, for instance, and assume that they share the upstream bandwidth in the ratio of 1:2:3. In this case, one sixth of data grant entries stored in the grant table 81 are allocated to the first ONU #1, two sixth of them to the second ONU #2, and three sixths of them to the third ONU #3.

Referring back to FIG. 15, the grant FIFO 82 is composed of two FIFO memories, each capable of storing up to 53 data entries. The two memories are alternately used in reading and writing modes. That is, when one FIFO memory accepts write data, the other FIFO memory outputs read data. When all the entries are read or written, the two FIFO memories alternate their roles with each other. The buffer full detector 84 drives its output to high when the grant FIFO 82 is filled up with 53 data entries, meaning that all grants for one frame are ready. The PLOAM cell transmitter 6i receives data grants from the grant FIFO 82, and inserts them into a PLOAM cell. The resultant PLOAM cell is supplied to the MUX 5d (not shown).

Figure 16:
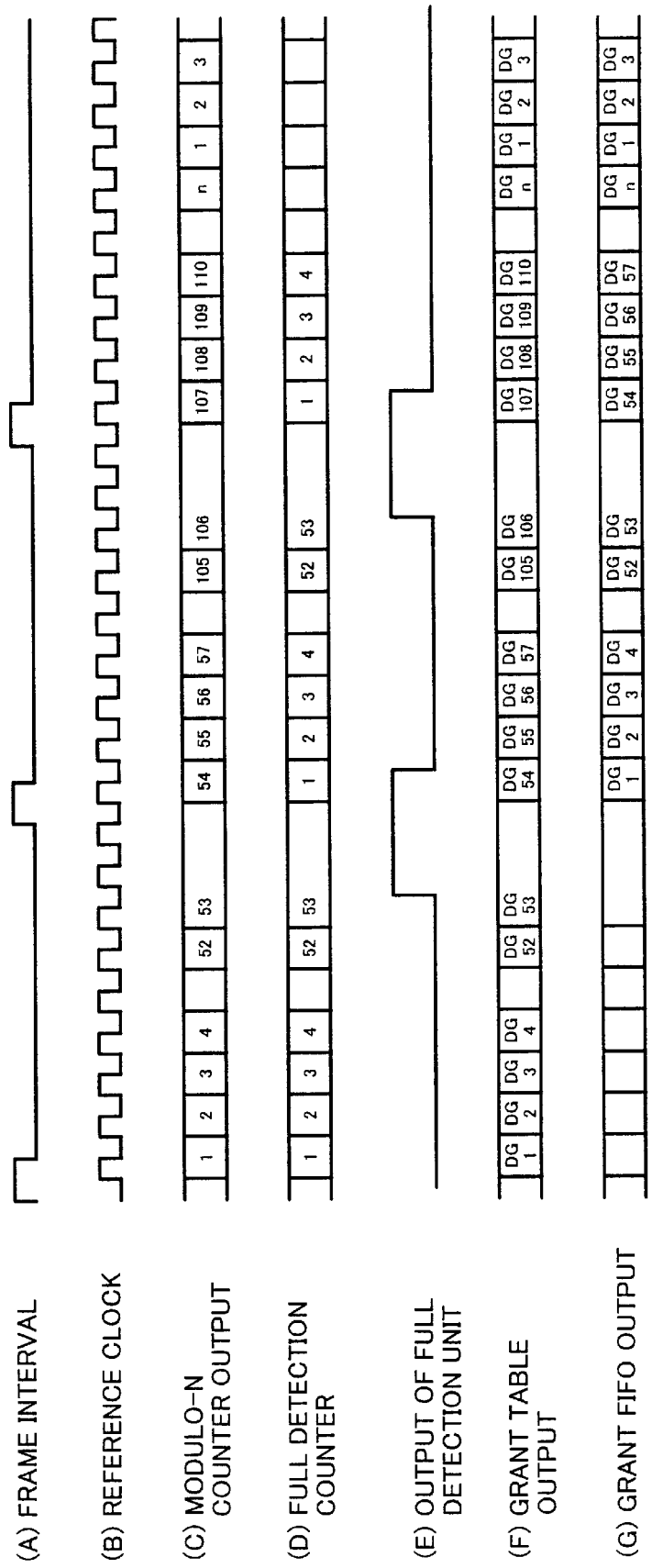
FIG. 16 is a timing diagram which explains the operation of the embodiment shown in FIG. 15.

Referring next to FIG. 16, the following section will describe the operation of the above embodiment.

FIG. 16 is a timing diagram which explains the operation of the embodiment of FIG. 15. Frame interval signal (A) indicates the beginning of each single frame. When this frame interval signal becomes high, it initiates the up-counting operation of the modulo-n counter 80 in synchronization with the reference clock (B). The resultant modulo-n counter output (C) is fed to the grant table 81.

As previously described, the grant table 81 stores data grant values, and they are read out according to its address input being driven by the modulo-n counter 80 and supplied to the grant FIFO 82 (see (F) of FIG. 16). The grant FIFO 82 employs two FIFO memories. One accepts write data from the grant table 81, while the other outputs data grants that have previously been written (see (G) of FIG. 16). The data grants read out of this grant FIFO 82 are fed to the PLOAM cell transmitter 6i. The buffer full detector 84 counts the data grant entries to be written into the grant FIFO 82 (see (D) of FIG. 16). If this count reaches "53," the buffer full detector 84 drives its output to high (see (E) of FIG. 16), making the modulo-n counter 80 stop temporarily (see (C) of FIG. 16). This state continues until the frame interval signal becomes high to indicate the beginning of a new frame. The modulo-n counter 80 then resumes the up-counting operation. When the modulo-n counter 80 reaches its maximum limit "n," its count value will return to "1" and repeats the above-described operations. Each time a PLOAM cell is issued, the grant FIFO 82 outputs data grants and supplies them to the PLOAM cell transmitter 6i one by one (see (G) of FIG. 16). PLOAM cells can carry 53 grants per frame, meaning that the PLOAM cell transmitter 6i transmits to the ATM-PON system up to 53 data grants for each frame.

As previously noted, the data grants stored in the grant table 81 have unique values assigned to different ONUs for identification purposes. Preferably, each ONU's share of data grants is proportional to the allocation of user bandwidth to that ONU. That is, the proposed OLT issues data grants to each ONU in accordance with the user bandwidth that is previously allocated to it. Further, if necessary, the user bandwidth allocation to ONUs may be changed by altering the entries of the grant table 81.

According to the above-described embodiment of the invention, the proposed OLT allocates the desired user bandwidth to each ONU by arranging the contents of the grant table 81. It is also possible to change the allocation as required.

Figure 17:
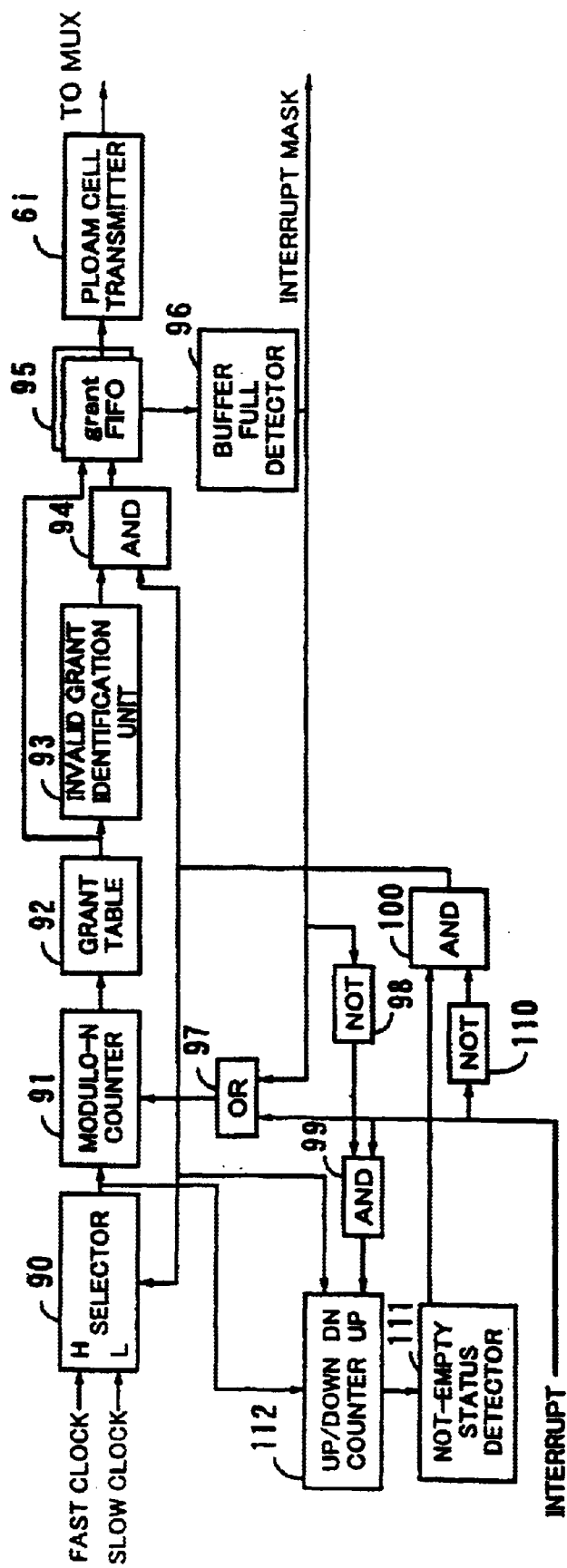
FIG. 17 is a block diagram which shows another implementation of the data grant generator in detail, together with its related elements.

Referring next to FIG. 17, the following section will explain another detailed structure of the data grant generator 6f shown in FIG. 1.

FIG. 17 first shows that a fast and slow clock signals are supplied to a selector 90. It selects the fast clock signal when the output of an AND gate 100 is high, and the slow clock signal when the same is low. The selected clock signal is supplied to a modulo-n counter 91. In synchronization with this supplied clock signal, the modulo-n counter 91 performs up-counting operations and sends its resultant count value to a grant table 92. When the modulo-n counter 91 has reached its maximum limit "n,"its count value will return to its initial value "1" and repeats the above-described operations.

The grant table 92 stores a plurality (n) of addressable entries, from #1 to #n, each of which holds a single data grant. When this grant table 92 shows an invalid data grant, an invalid grant identification unit 93 outputs a high. This could happen when, for example, the data grant is not associated with any existing ONUs.

While the grant table 92 supplies data grant values to a grant FIFO 95, the write operation to this grant FIFO 95 is disabled by an AND gate 94 when both the invalid grant identification unit 93 and AND gate 100 output high level signals. The grant FIFO 95 is actually comprises two FIFO memories, each being capable of buffering 53 data entries. The two FIFO memories alternately operate in read mode or in write mode.

When the grant FIFO 95 in write mode has accepted 53 data grant entries, a buffer full detector 96 indicates this buffer full status by outputting a high. The output of an OR gate 97 goes high in the case that an interrupt signal is produced, or the buffer full detector 96 indicates a buffer full status. This causes the modulo-n counter 91 to stop its up-counting operation for a while.

An AND gate 99 receives the output of an inverter 98 and the interrupt signal, and it produces a high level signal when both outputs are high. This means that the AND gate 99 sets its output to high when an interrupt is active but the grant FIFO 95 still has some space. When the output of the AND gate 99 is high, an up/down counter 112 counts up at the rate of the clock signal selected by the selector 90. It also counts down at the same rate when the output of the AND gate 100 is high. A not-empty status detector 111 sets its output to high when the up/down counter 112 exhibits non-zero count values. The aforementioned AND gate 100 outputs a high when the outputs of the inverter 110 and not-empty status detector 111 are both high. This means that the AND gate 100 asserts its output signal if there is no interrupt and the up/down counter 112 exhibits a non-zero count value.

Figure 18:
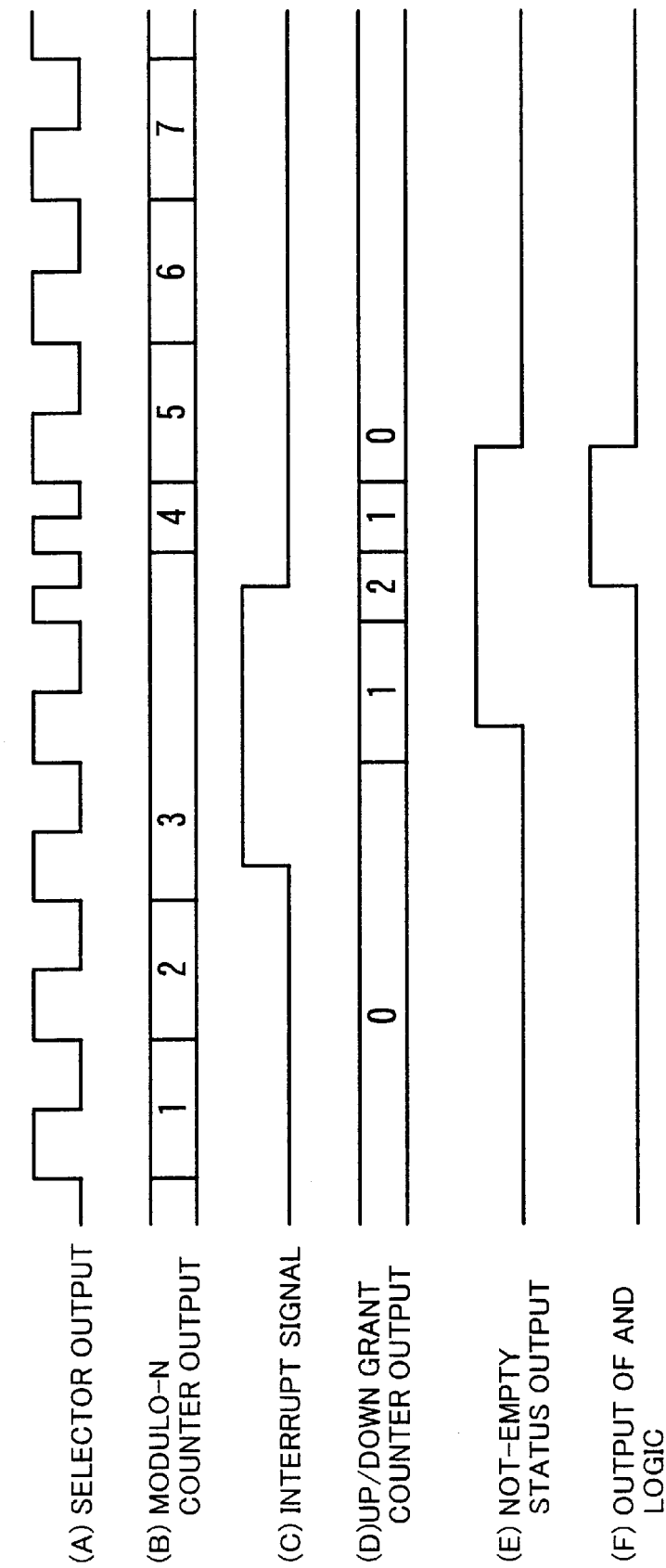
FIG. 18 is a timing diagram which explains the operation of the embodiment shown in FIG. 17.

The above-described embodiment will operate as follows. FIG. 18 is a timing diagram which explains the operation of the embodiment shown in FIG. 17. As shown in (F) of FIG. 18, the AND gate 100 outputs a low in normal conditions, where there is no interrupt. Therefore, the selector 90 chooses a slow clock signal (or normal clock signal) for the use in the modulo-n counter 91 as shown in (A) of FIG. 18. The modulo-n counter 91 counts up at the rate of this slow clock signal and looks up the grant table 92 as shown in (B) of FIG. 18. The grant table 92 thus retrieves a data grant value from the specified address and supplies it to the invalid grant identification unit 93 and grant FIFO 95. If the retrieved data grant value is found to be invalid, the invalid grant identification unit 93 outputs a high, and this makes the AND gate 94 assert its output if the output of the AND gate 100 is also high. In the present example, the AND gate 94 outputs a high because the AND gate 100 is deactivated by a low output signal of the not-empty status detector 111. As a result of the above, all data grants read out of the grant table 92 are written into the grant FIFO 95. Those data grants are then supplied from the grant FIFO 95 to the MUX 5d through the PLOAM cell transmitter 6i, which inserts them into downstream PLOAM cells.

Suppose that an interrupt has occurred in the above situation, as shown in the middle part of FIG. 18, where the interrupt signal (C) goes high. Since this interrupt signal activates the OR gate 97, the modulo-n counter 91 should stop its up-counting operation for a moment as shown in (B) of FIG. 18. The interrupt signal also causes the AND gate 99 to output a high, which enable the up/down counter 112 to count up at the rate of the clock signal supplied from the selector 90 as shown in (D) of FIG. 18. The up/down counter 112 continues its up-counting operation until the interrupt signal is negated, thus indicating how many data grants have been suspended by the interrupt. The not-empty status detector 111 detects such non-zero count values of the up/down counter 112, and causes its output (E) to go high. This high level signal, together with the high-level output of the inverter 110 (i.e., negation of the interrupt signal), will then cause the AND gate 100 to output a high as shown in (F) of FIG. 18. Accordingly, the selector 90 selects the fast clock signal and supplies it to the modulo-n counter 91 as shown in (A) of FIG. 18. The modulo-n counter 91 now begins to count up at a faster rate, thus accelerating the write operation of data grants to the grant FIFO 95.

The output of the AND gate 100 is also supplied to the AND gate 94, meaning that any invalid data grant from the grant table 92 would stop the write operation to the grant FIFO 95. As a result, data grants can be written into the grant FIFO 95 more quickly, skipping invalid ones, if any.

With the high state of the AND gate 100's output, the up/down counter 112 switches its operation mode from up-counting to down-counting, and the count value now begins to decrease as the clock signal is entered. When the count value of the up/down counter 112 reaches zero, the not-empty status detector 111 recognizes this and changes its output to low. This makes the output of the AND gate 100 go low, and thus the selector 90 selects the slow clock again. Consequently, the modulo-n counter 91 regains its normal counting operation mode, and the grant FIFO 95 begins to receive any grants including invalid ones.

According to the above-described embodiment of the invention, the controller 6 deals with data grants suspended by an interrupt, through the process of counting the number of suspended data grants during the interrupt, and writing them (except for invalid grants) at a higher rate after the interrupt is negated. This mechanism enables the OLT to send necessary data grants to ONUs in a more reliable manner. Although, in the above embodiment, the fast clock signal is used only within a limited time period when the suspended data grants are being transferred, this period may be extended so that more data grants will be sent out at a higher clock rate.

Figure 19:
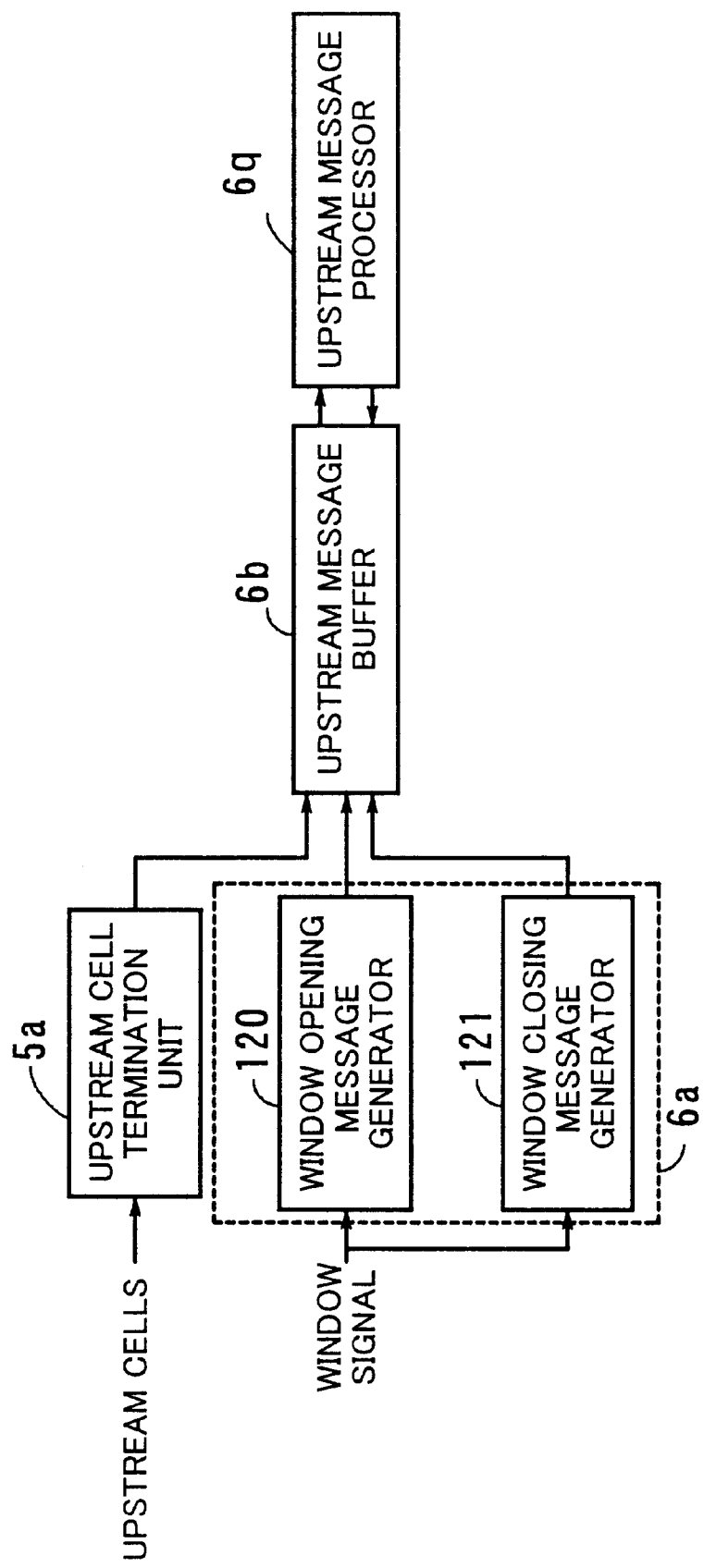
FIG. 19 is a block diagram which shows the details of a window controller and its related elements shown in FIG. 1.

Referring next to FIG. 19, the following section will explain the structure and operation of the upstream cell termination unit 5a, window controller 6a, upstream message buffer 6b, and upstream message processor 6q shown in FIG. 1.

As seen from FIG. 19, the window controller 6a comprises a window opening message generator 120, and a window closing message generator 121. At the rising edge of a window signal, the window opening message generator 120 produces a pseudo message WS to open a window, and then writes it to the upstream message buffer 6b. The term "pseudo messages" refers to messages which are not received from ONUs, but internally produced by the OLT. The window closing message generator 121, on the other hand, produces and writes another pseudo message WE into the upstream message buffer 6b, detecting the falling edge of the window signal. The upstream message processor 6q reads out those messages sequentially from the upstream message buffer 6b and executes specified processes for them.

Figure 20:
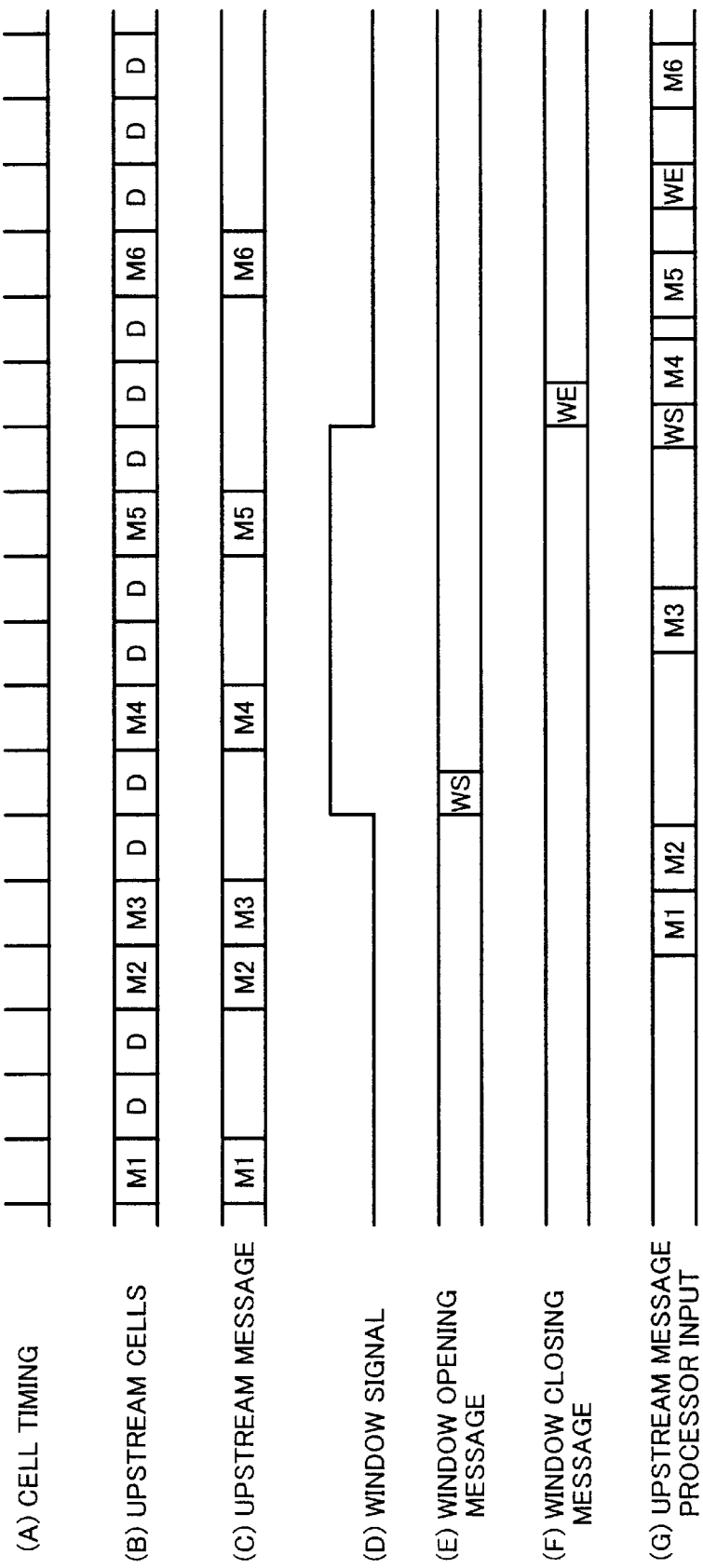
FIG. 20 is a timing diagram which explains the operation of the embodiment shown in FIG. 19.

The operation of the above-described embodiment will now be explained below. FIG. 20 is a timing diagram which explains the operation of the embodiment of FIG. 19. The upstream cell termination unit 5a extracts upstream messages (C) from upstream cells (B) received from ONUs at cell intervals (A). The extracted messages are supplied to the upstream message buffer 6b. In the example of FIG. 20, the upstream cells (B) include data cells "D" and message cells "M1" to "M6." The upstream cell termination unit 5a extracts the latter cells and supplies them to the upstream message buffer 6b as shown in (C) of FIG. 20.

It is assumed here that a new ONU is attempting to join the network and the controller 6 has set the window signal (D) to high, accordingly. This low-to-high transition of the window signal directs the window opening message generator 120 to produce a pseudo message "WS" (E) to open a ranging window. This message "WS" is then written into to the upstream message buffer 6b. When the window signal (D) goes low, the window closing message generator 121 produces and writes a pseudo message "WE" (F) to the upstream message buffer 6b. The above write operation of pseudo messages is performed during an idle period available in each cell interval (A), not to conflict with the writing of other messages.

In this way, the received upstream messages "M1" to "M6" and the produced pseudo messages "WS" and "WE" are put into the upstream message buffer 6b. The upstream message processor 6q sequentially reads them out of the buffer 6b and executes an appropriate process for each of them. Here, the upstream message processor 6q makes access to the upstream message buffer 6b when it has processed the previous message and is now ready to accept the next one. Since the required processing time may differ from message to message, the read access to the upstream message buffer 6b is not necessarily synchronized with the phase or interval of upstream cells illustrated in (G) of FIG. 20.

Again, the window opening and window closing pseudo messages "WS" and "WE" indicate the beginning and end of a window period. If those pseudo messages are received from the upstream message buffer 6b, then the upstream message processor 6q determines whether the OLT has properly received delay measurement messages from ONUs during the window period. Suppose, for example, that the message "M4" among the upstream messages (C) is not a delay measurement message, but is another kind of message that happened to be transmitted erroneously during the window period. In this case, the upstream message processor 6q would recognize the next message "M5" as a valid delay measurement message, while neglecting the message "M4."

According to the above-described embodiment of the present invention, the window controller 6a produces window opening and window closing pseudo messages at the rising and falling edges to explicitly indicate the beginning and end of a window period, and it puts those pseudo messages into the upstream message buffer 6b. As a result, the upstream message processor 6q can distinguish delay measurement messages clearly from other messages. This feature of the invention enables more reliable delay measurement.

Figure 21:
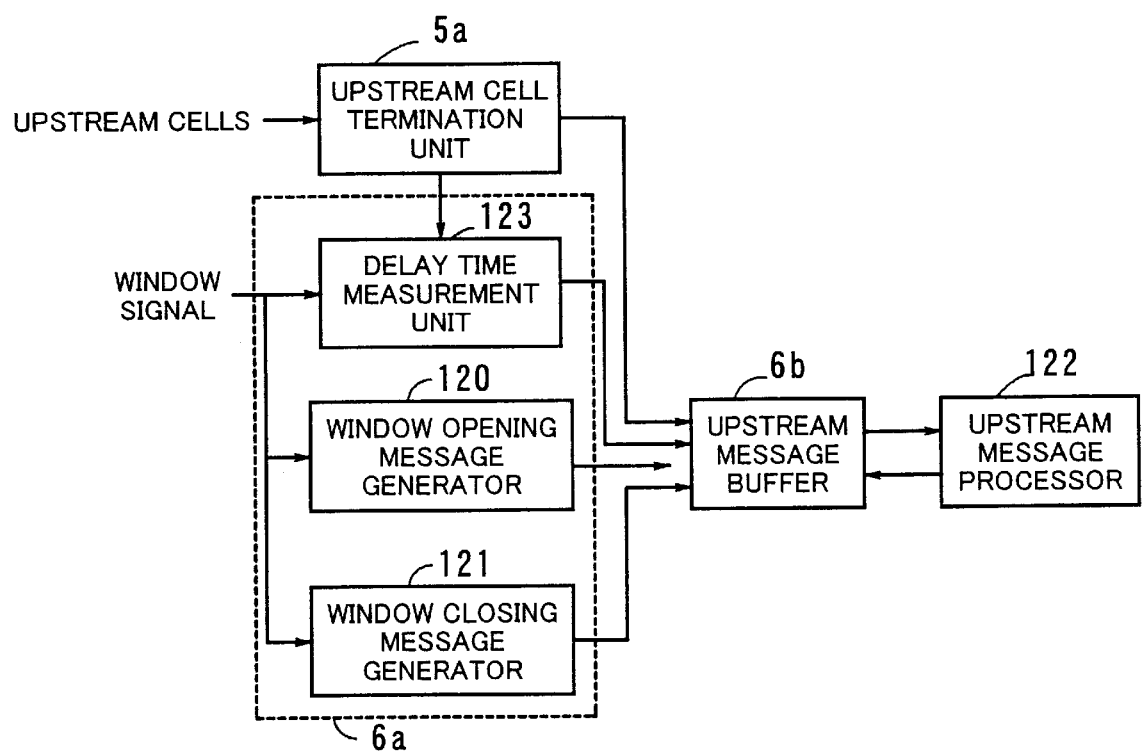
FIG. 21 is a block diagram which shows another implementation of the window controller in detail, together with its related elements.
Figure 22:
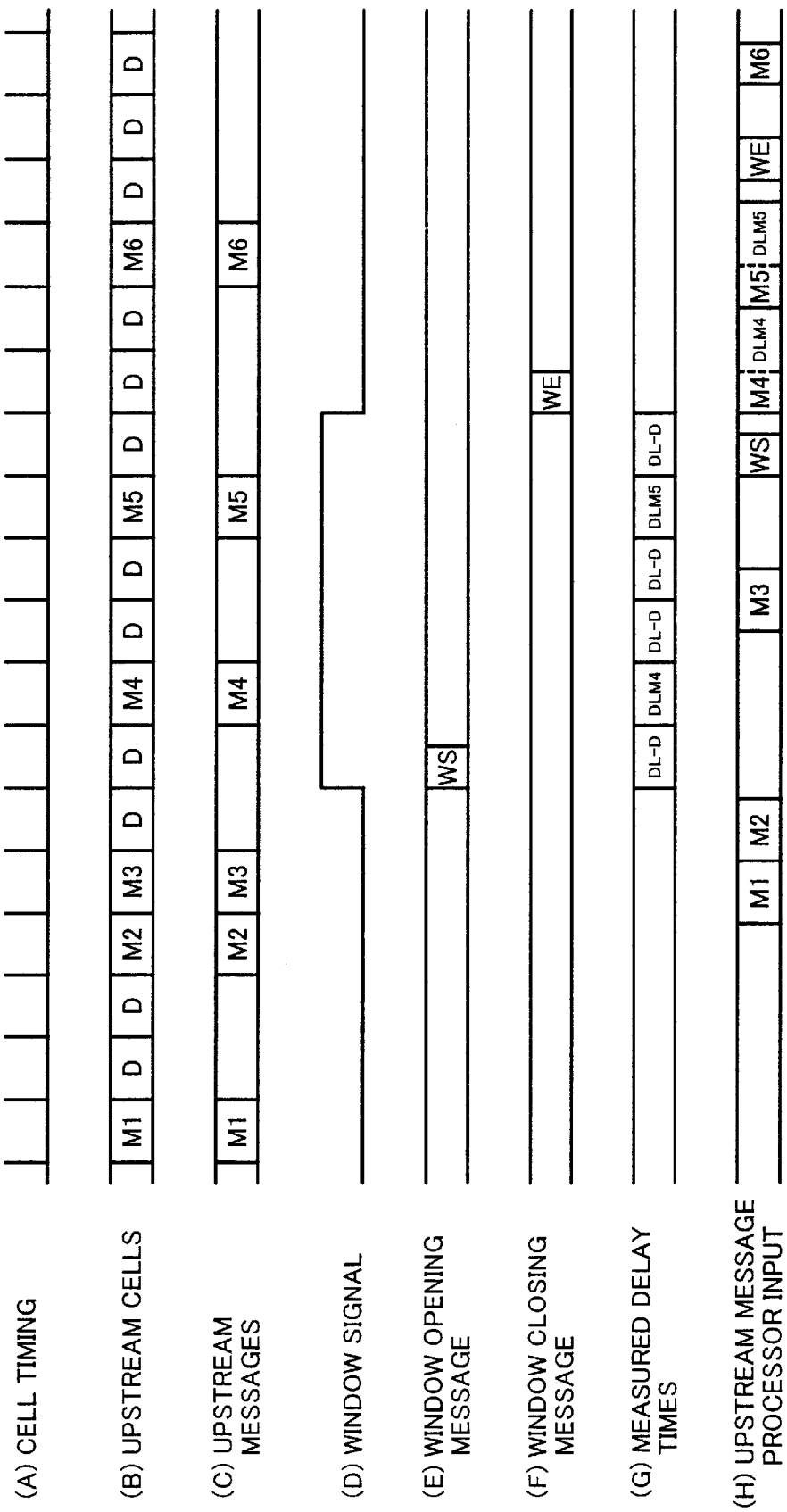
FIG. 22 is a timing diagram which explains the operation of the embodiment shown in FIG. 21.
Figure 23:
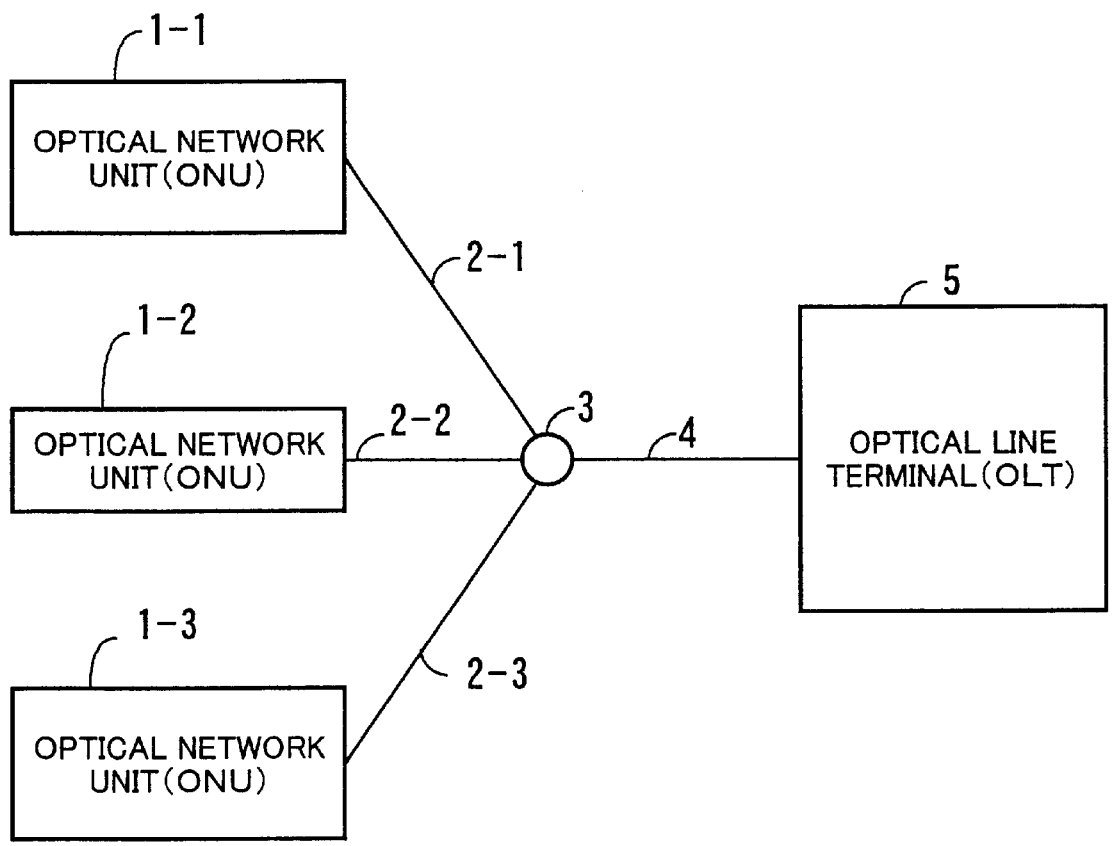
FIG. 23 is a diagram which briefly shows an ATM-PON transmission system.
Figure 24:
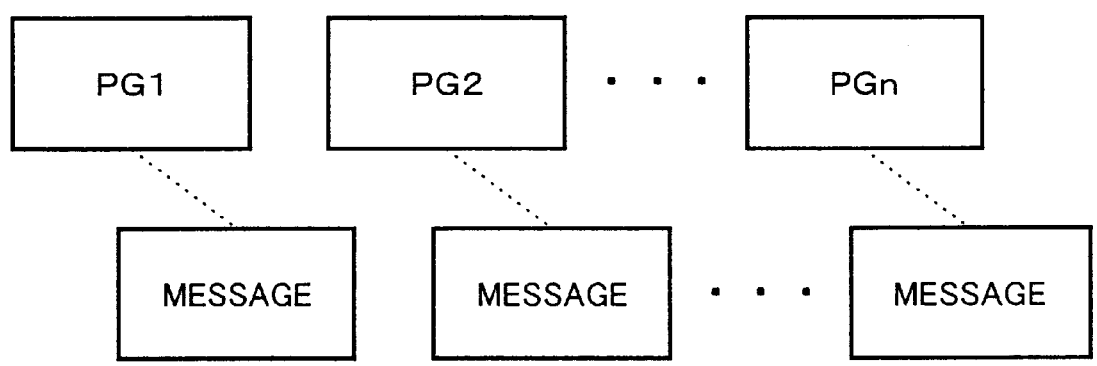
FIG. 24 is a diagram which briefly shows PLOAM cells exchanged between OLT and ONU.

Referring lastly to FIGS. 21 and 22, the following section will present another structure and its operation of the upstream cell termination unit 5a, window controller 6a, upstream message buffer 6b, and upstream message processor 6q previously explained in FIG. 1.

As seen from the block diagram of FIG. 21, the window controller 6a comprises a window opening message generator 120, a window closing message generator 121, and a delay time measurement unit 123. Further, the upstream message processor 6q explained in FIG. 1 now appears in FIG. 21 as an upstream message processor 122.

The window opening message generator 120 produces a pseudo message "WS" indicating the start of a window period upon detection of assertion of the window signal. This pseudo message "WS" is put into the upstream message buffer 6b. The window closing message generator 121, on the other hand, produces and writes another pseudo message "WE" to the upstream message buffer 6b, detecting the falling edge of the window signal. The pseudo message "WE" indicates the end of the window period. Further, the delay time measurement unit 123 measures delay times of upstream cells, including both data and message cells, received and supplied by the upstream cell termination unit 5a. The measured delay time of each message is fed to the upstream message buffer 6b. The upstream message buffer 6b saves this delay time data when an upstream message is received from the upstream cell termination unit 5a. This write access is performed during an idle period, not to conflict with the writing of messages.

The upstream message processor 122 reads out those messages sequentially from the upstream message buffer 6b and executes specified processes for them. Further, when a window opening pseudo message "WS" is encountered, the upstream message processor 122 retrieves a delay measurement message and extracts its measured delay time within the window period, which begins with the window opening pseudo message "WS" and ends with the corresponding window closing pseudo message "WE." With that information, the upstream message processor 122 calculates the delay time of the newly joined ONU.

The operation of the above-described embodiment of FIG. 21 will now be explained below, with reference to a timing diagram of FIG. 22. The upstream cell termination unit 5a extracts upstream messages (C) from upstream cells (B) received from ONUs at cell intervals (A). The extracted messages (C) are supplied to the upstream message buffer 6b. The delay time measurement unit 123 measures delay times of these cells and sends the measured delay time data (G) to the upstream message buffer 6b. In the example of FIG. 22, the delay time data (G) include: measured delay times DL-D of data cells, and measured delay times DLM4 and DLM5 of messages M4 and M5. The upstream message buffer 6b saves such delay time data when the corresponding upstream messages are received from the upstream cell termination unit 5a.

The upstream message processor 122 retrieves those messages from the upstream message buffer 6b sequentially and executes appropriate processes for them. If a window opening pseudo message "WS" is encountered, the upstream message processor 122 interprets it as the beginning of a window period and thus tries to detect a relevant delay measurement message. This message should be found among the subsequent messages before detecting a window closing pseudo message "WE" which indicates the end of the window period.

Suppose, for example, that the message "M4" among the upstream messages (C) is an irrelevant message that happened to be transmitted erroneously during the window period. In the example of FIG. 22, the upstream message processor 122 neglects this message "M4," and instead, it recognizes the next message "M5" as a valid delay measurement message. Since this message "M5" is immediately followed by the measured delay time DLM5, the upstream message processor 122 takes it and calculates the delay time value of the newly activated ONU.

To summarize the above-described embodiment of FIGS. 21 and 22, the window controller 6a writes measured delay times into the upstream message buffer 6b, together with received upstream messages. When a particular ONU returns a delay measurement message, the upstream message processor 122 can locate this message between a window opening pseudo message and a window closing pseudo message. Also, the message is immediately followed by its relevant delay time value, which was measured and stored in the upstream message buffer 6b. This allows the upstream message processor 122 to calculate the upstream delay time of the ONU in a more accurate fashion.

The above sections have described several preferred embodiments of the present invention, illustrating an improved optical line terminal that controls ONUs with more reliable techniques to address various problems in controlling ATM-PON systems. Those techniques will now be summarized as follows.

According to the first aspect of the present invention, there is provided an optical line terminal (OLT) which controls one or more optical network units (ONUs) connected thereto, and advantageously, this OLT functions as follows. A cyclic trigger signal generator generates a trigger signal at predetermined intervals. In synchronization with this trigger signal, a PLOAM grant generator produces a message transmission permission (i.e., PLOAM grant) which permits a specified OMU to transmit a message (i.e., PLOAM cell) upstream to the OLT. A PLOAM cell transmitter transmits the produced message transmission permission toward the ONUs. This structure enables the proposed OLT to receive more reliably such upstream messages that are produced by the ONUs on a regular basis.

According to the second aspect of the present invention, there is provided an OLT which controls one or more ONUs connected thereto, and advantageously, this OLT functions as follows. A downstream message generator produces messages to be sent to the ONUs. From among the messages produced by the downstream message generator, a message code detector identifies a response request message that requests one of the ONUs to return a response. A cell extraction unit identifies the destination ONU for which the response request message identified by the message code detector is destined. A PLOAM grant generator issues a message transmission permission (i.e., PLOAM grant) that permits the destination ONU identified by the cell extraction unit to send a message (i.e., PLOAM cell). A PLOAM cell transmitter transmits the message transmission permission issued by the PLOAM grant generator to the destination ONU. This proposed OLT can receive more reliably such messages that are produced by the ONUs on a regular basis.

According to the third aspect of the present invention, there is provided an OLT which controls one or more ONUs connected thereto, and advantageously, this OLT functions as follows. An upstream cell termination unit receives messages from the ONUs. A message code detector extracts valid messages from among the messages received by the upstream cell termination unit, through a process of filtering out such messages that indicate that the sending ONUs have no information to send. A cell extraction unit identifies the sending ONUs which are sourcing the valid messages extracted by the message code detector. A PLOAM grant generator produces message transmission permissions (i.e., PLOAM grants) which permit the sending ONUs identified by the cell extraction unit to transmit messages (i.e., PLOAM cells). The message transmission permissions produced by the PLOAM grant generator are then transmitted to the ONU through a PLOAM cell transmitter. The proposed OLT can receive messages from a plurality of ONUs more reliably, because of its capability of allocating message transmission permissions to the ONUs depending on their individual conditions.

According to the fourth aspect of the present invention, there is provided an OLT which controls one or more ONUs connected thereto, and advantageously, this OLT functions as follows. An upstream cell termination unit receives messages from the ONUS. An upstream message buffer temporarily stores the messages received by the upstream cell termination unit. The amount of messages being stored in the upstream message buffer is monitored by a buffer occupancy detector. A PLOAM grant generator produces message transmission permissions which permit the ONUs to transmit messages. An excess detector directs the PLOAM grant generator to limit the production of message transmission permissions when the buffer occupancy detector detects that the amount of messages stored in the upstream message buffer exceeds a predetermined threshold. The proposed OLT can control the amount of messages transmitted from ONUs, depending on the maximum capacity of its upstream message buffer.

According to the fifth aspect of the present invention, there is provided an OLT which controls one or more ONUs connected thereto, and advantageously, this OLT has the following message buffers: a cyclic message buffer for first messages (cyclic messages) that should be transmitted on a regular basis; a time-critical message buffer for second messages (time-critical messages) that should be transmitted within a predetermined time period; and a non-critical message buffer) for third messages (non-critical messages) that have no time constraints. A read operation controller transmits the first through third messages to the ONUs. A message buffer monitor and read operation controller give the highest priority to the first messages and the lowest priority to the third messages when the transmission of the first through third messages is congested, and control the read operation controller so that the messages will be transmitted to the ONUs in accordance with the priority levels given to the messages. This structure of the proposed OLT enables more important messages to be transmitted first.

According to the sixth aspect of the present invention, there is provided an OLT which controls one or more ONUs connected thereto, and advantageously, this OLT functions as follows. A downstream message generator produces various messages to be transmitted to the ONUs. They are divided into groups and saved into a plurality (n: n>1) of message buffers according to their message types. A message buffer monitor and read operation controller read the messages from the non-critical message buffers sequentially, as well as remembering which message buffer was accessed most recently. After an interrupt, the read operation controller resumes message reading operations in such a way that the next message will be retrieved from a message buffer that is next to the most recently used buffer. Such downstream messages are transmitted to ONUs through a PLOAM cell transmitter. This feature of the present invention prevents the downstream traffic from being used unevenly for specific messages.

According to the seventh aspect of the present invention, there is provided an OLT which controls one or more ONUs connected thereto, and advantageously, this OLT functions as follows. A grant table stores a plurality of data transmission permissions, each permitting a specific ONU to transmit data. A grant FIFO buffers data transmission permissions reads out of the grant table at predetermined intervals, and a PLOAM cell transmitter transmits them to the ONUs. This structure enables the proposed OLT to reliably allocate necessary network bandwidth to a plurality of ONUs.

According to the eighth aspect of the present invention, there is provided an OLT which controls one or more ONUs connected thereto, and advantageously, this OLT functions as follows. An upstream cell termination unit receives a series of messages sent from ONUs. A window opening message generator detects the beginning of a window period which is established to measure a delay time specific to an ONU that is newly activated, and it inserts a first message indicating the beginning of the window period into the series of messages received by the upstream cell termination unit. A window closing message generator, on the other hand, detects the end of the window period and inserts a second message indicating the end of the window period into the series of received messages. An upstream message processor recognizes a section between the first and second messages as the window period, and then extracts a delay measurement message found within the window period. The upstream message processor calculates a delay time that is specific to the activated ONU, with reference to the extracted delay measurement message. This structure enables the proposed OLT to precisely measure the delay time of an ONU when it is newly activated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical line terminal which controls one or more optical network units connected thereto, comprising:

trigger signal generation means for generating a trigger signal at predetermined intervals;

message transmission granting means for producing a message transmission permission which permits one of the optical network units to transmit a message, in synchronization with the trigger signal generated by said trigger signal generation means; and transmission means for transmitting to the optical network units the message transmission permission produced by said message transmission granting means;

wherein said trigger signal generation means generates a plurality of trigger signals having different phases by producing one original trigger signal at the predetermined intervals and then shifting the original trigger signal successively by a predetermined time; and said message transmission granting means produces the message transmission permission to be granted to only one of the optical network units, in synchronization with relevant one of the plurality of trigger signals.

2. An optical line terminal which controls one or more optical network units connected thereto, comprising:

message generation means for producing messages to be sent to the optical network units;

response request message identification means for identifying, among the messages produced by said message generation means, a response request message that requests one of the optical network units to return a response;

destination identification means for identifying the one of the optical network units for which the response request message identified by said response request message identification means is destined;

message transmission granting means for issuing a message transmission permission which permits the destination optical network unit identified by said destination identification means to send a message; and transmission means for transmitting the message transmission permission issued by said message transmission granting means to the destination optical network unit.

3. An optical line terminal which controls one or more optical network units connected thereto, comprising:

reception means for receiving messages from the optical network units;

message extraction means for extracting valid messages from among the messages received by said reception means, by filtering out such messages that indicate that the sending optical network units have no information to send;

destination identification means for identifying the sending optical network units which are sourcing the valid messages extracted by said message extraction means;

message transmission granting means for producing message transmission permissions which permit the sending optical network units identified by said destination identification means to transmit messages; and transmission means for transmitting the message transmission permissions produced by said message transmission granting means to the optical network unit.

4. An optical line terminal which controls one or more optical network units connected thereto, comprising:

reception means for receiving messages from the optical network units;

storage means for temporarily storing the messages received by said reception means;

message amount monitoring means for monitoring the amount of messages being stored in said storage means;

message transmission granting means for producing message transmission permissions which permit the optical network units to transmit messages; and limiting means for directing said message transmission granting means to limit the production of the message transmission permissions when said message amount monitoring means detects that the amount of messages exceeds a predetermined threshold.

5. The optical line terminal according to claim 4, wherein said limiting means limits the production of the message transmission permissions except for a class of messages that the optical network units should transmit on a regular basis.

6. The optical line terminal according to claim 4, further comprising threshold changing means for changing the threshold which is used by said limiting means.

7. An optical line terminal which controls one or more optical network units connected thereto, comprising:

message generation means for producing messages to be transmitted to the optical network units;

first through nth storage means for storing the messages which are produced by said message generation means and sorted according to message types thereof; reading means for reading out sequentially the messages stored in said first to nth storage means; memory means for storing information that identifies which of said first through nth storage means was most recently accessed in the sequential read operation by said reading means;

control means for controlling resumption of message reading by said reading means, so that said reading means will begin with one of said plurality of storage means that is next to the storage means that is identified by the information stored in said memory means; and transmission means for transmitting the message read out by said reading means to the optical network units.

8. An optical line terminal which controls one or more optical network units connected thereto, comprising:

memory means for storing a plurality of data transmission permissions, each of which permits a specific optical network unit to transmit data;

reading means for reading out the data transmission permissions from said storage means at predetermined intervals;

transmission means for transmitting the data transmission permissions read out by said reading means to the optical network units;

interrupt detection means for detecting an interrupt that would temporarily hamper the data transmission permissions from being transmitted; and high-speed reading means, taking place of said reading means for a predetermined period, when said interrupt detection means has detected an interrupt, for reading the data transmission permissions faster than said reading means and supplying said transmission means with the data transmission permissions.

9. The optical line terminal according to claim 8, wherein the number of data transmission permissions that are granted to each single optical network unit is determined in accordance with a predetermined channel bandwidth to be allocated to said each single optical network unit.

10. The optical line terminal according to claim 8, wherein said high-speed reading means counts the number of data transmission permissions that have been suspended by the interrupt, and reads out as many data transmission permissions as the number of suspended data transmission permissions.

11. The optical line terminal according to claim 8, further comprising transmission skipping means for skipping transmission of an invalid data transmission permission that is found in the data transmission permissions read out by said high-speed reading means.

12. An optical line terminal which controls one or more optical network units connected thereto, comprising:

reception means for receiving a series of messages sent from the optical network units;

window opening detection means for detecting the beginning of a window period which is established to measure a delay time specific to an optical network unit that is newly activated;

first message insertion means, responsive to said window opening detection means, for inserting a first message indicating the beginning of the window period into the series of messages received by said reception means;

window closing detection means for detecting the end of the window period;

second message insertion means, responsive to said window closing detection means, for inserting a second message indicating the end of the window period into the series of messages received by said reception means;

delay measurement message extraction means for recognizing a section between the first and second messages as the window period, and extracting a delay measurement message found within the window period; and delay time calculation means for calculating a delay time specific to the activated optical network unit by referring to the delay measurement message extracted by said delay measurement message extraction means.

13. The optical line terminal according to claim 12, further comprising:

delay time measuring means for measuring a delay time of each message received by said reception means;

delay time attaching means for attaching the delay time measured by said delay time calculation means to each message received by said reception means;

wherein said delay time calculation means equates the delay time attached to the delay measurement message with the delay time specific to the activated optical network unit.

* * * * *